US009794458B2

(12) United States Patent
Imamura et al.

(10) Patent No.: US 9,794,458 B2
(45) Date of Patent: *Oct. 17, 2017

(54) CAMERA SYSTEM, CAMERA BODY, AND COMMUNICATION METHOD FOR ACQUIRING LENS INFORMATION

(71) Applicant: FUJIFILM Corporation, Tokyo (JP)

(72) Inventors: Kenshi Imamura, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,776

(22) Filed: Apr. 7, 2016

(65) Prior Publication Data

US 2016/0227083 A1 Aug. 4, 2016

Related U.S. Application Data

(63) Continuation of application No. PCT/JP2014/075364, filed on Sep. 25, 2014.

(30) Foreign Application Priority Data

Nov. 8, 2013 (JP) ................................ 2013-232424

(51) Int. Cl.
*H04N 5/225* (2006.01)
*G03B 17/14* (2006.01)
(Continued)

(52) U.S. Cl.
CPC .......... *H04N 5/2254* (2013.01); *G03B 17/14* (2013.01); *H04N 5/04* (2013.01); *H04N 5/23209* (2013.01);
(Continued)

(58) Field of Classification Search
CPC ..... G03B 17/14; G03B 19/12; H04N 5/23209
See application file for complete search history.

(56) References Cited

U.S. PATENT DOCUMENTS

2003/0095190 A1 5/2003 Mizutani et al.
2007/0019957 A1 1/2007 Kim et al.
(Continued)

FOREIGN PATENT DOCUMENTS

JP 2003-125272 A 4/2003
JP 2007-28640 A 2/2007
(Continued)

OTHER PUBLICATIONS

International Preliminary Report on Patentability for PCT/JP2014/075364 (PCT/IPEA/409) completed on. Oct. 6, 2015.
(Continued)

*Primary Examiner* — Sinh Tran
*Assistant Examiner* — Selam T Gebriel
(74) *Attorney, Agent, or Firm* — Birch, Stewart, Kolasch & Birch, LLP

(57) ABSTRACT

A camera system, a camera body, and a communication method capable of satisfactorily acquiring lens information necessary for image processing or the like for a frame of a video from an interchangeable lens are provided. Three-wire serial communication is performed in which a request signal is transmitted to the interchangeable lens in synchronization with a synchronization signal (VSYNC) of an imaging element in a video recording mode, and a response signal is received from the interchangeable lens. In a communication mode in the video recording mode, the number of transmissions of a first request signal relating to acquisition of lens information such as a focus position, a diaphragm value, and a zoom position is limited. Accordingly, communication
(Continued)

other than communication relating to acquisition of lens information can be performed in a period of one frame.

22 Claims, 11 Drawing Sheets

(51) Int. Cl.

| | |
|---|---|
| ***H04N 5/232*** | (2006.01) |
| ***H04N 5/04*** | (2006.01) |
| ***H04N 5/91*** | (2006.01) |
| ***H04N 5/77*** | (2006.01) |
| ***H04N 9/804*** | (2006.01) |
| *H04N 5/783* | (2006.01) |

(52) U.S. Cl.

CPC ..... *H04N 5/23212* (2013.01); *H04N 5/23245* (2013.01); *H04N 5/772* (2013.01); *H04N 5/91* (2013.01); *H04N 9/8042* (2013.01); *G03B 2206/00* (2013.01); *H04N 5/783* (2013.01)

(56) References Cited

U.S. PATENT DOCUMENTS

2008/0199169 A1* 8/2008 Yoshida .................. G03B 3/10 396/95

2010/0110278 A1* 5/2010 Higurashi .......... H04N 5/23212 348/361

2011/0080488 A1 4/2011 Okamoto et al.

2011/0096200 A1 4/2011 Shibuno et al.

2011/0187874 A1 8/2011 Kikuchi

2012/0262595 A1* 10/2012 Kishida .................... G02B 7/08 348/220.1

2012/0294598 A1* 11/2012 Oikawa .................. G03B 17/14 396/125

2013/0044239 A1* 2/2013 Makigaki ............... H04N 5/225 348/231.99

2013/0176480 A1* 7/2013 Makigaki ............... G03B 17/14 348/361

FOREIGN PATENT DOCUMENTS

| | | | |
|---|---|---|---|
| JP | 2007-101962 | A | 4/2007 |
| JP | 2007-300550 | A | 11/2007 |
| JP | 2009-258714 | A | 11/2009 |
| JP | 2011-49641 | A | 3/2011 |
| JP | 2012-58524 | A | 3/2012 |
| JP | 2012-505562 | A | 3/2012 |
| JP | 2013-33184 | A | 2/2013 |
| WO | WO 2009/139118 | A1 | 11/2009 |

OTHER PUBLICATIONS

International Search Report for PCT/JP2014/075364 (PCT/ISA/210) mailed on Dec. 22, 2014.

Written Opinion of the International Searching Authority for PCT/JP2014/075364 (PCT/ISA/237) mailed on Dec. 22, 2014.

* cited by examiner

CAMERA SYSTEM, CAMERA BODY, AND COMMUNICATION METHOD FOR ACQUIRING LENS INFORMATION

CROSS-REFERENCE TO RELATED APPLICATIONS

This application is a Continuation of PCT International Application No. PCT/JP2014-075364 filed on Sep. 25, 2014, which claims priority under 35 U.S.C. §119 (a) to Japanese Patent Application No. 2013-232424 filed on Nov. 8, 2013. Each of the above application(s) is hereby expressly incorporated by reference, in its entirety, into the present application.

BACKGROUND OF THE INVENTION

1. Field of the Invention

The present invention relates to a camera system, a camera body, and a communication method, and particularly, to a communication technology between the camera body and the interchangeable lens.

2. Description of the Related Art

Recent digital cameras capable of high-quality video capturing of a full-high definition video (Full-HD video) or the like have been widespread with increasing speed of an imaging element. Similarly, a camera with an interchangeable lens is also capable of high-quality video capturing, but in order to perform image processing on a video according to lens characteristics, a camera body needs to acquire lens information (for example, focus position information, diaphragm information, and zoom information) for each frame during video capturing.

Further, there is conventionally a communication method in which a camera body sends a request to a lens unit (interchangeable lens) periodically regardless of a frame rate of a video so as to confirm whether or not there is a change in a lens state, and the interchangeable lens sends a response regarding the lens state of an item in which there is a change, to the camera body. Accordingly, the lens information in video capturing is acquired and reflected in signal processing or the like.

However, driving of the lens may be normally required during video recording, and it is difficult to acquire the lens information always at regular intervals.

Meanwhile, in an invention described in JP2012-58524A, two systems of transfer paths (first transfer path and second transfer path) are provided between a camera body and an interchangeable lens, so that hotline communication is performed using the first transfer path, and command data communication is performed using the second transfer path.

Here, the hot line communication is unidirectional communication for transferring lens information from the interchangeable lens to the camera body in each period (for example, 1 ms) using the first transfer path, and the command data communication is bidirectional communication for transferring data transmitted from the camera body and data transmitted from the interchangeable lens using the second transfer path.

Meanwhile, in a camera system including a camera body and an interchangeable lens, a technology in which a camera body requests the interchangeable lens to provide optical transfer function (OTF) data that is a two-dimensional Fourier transform of a point spread function (PSF), which is used for a point image restoration process of a captured image from the camera body, and the interchangeable lens acquires lens setting information such as a zoom position, a diaphragm value (F value), and a subject distance in response to this request, reads the OTF data corresponding to the lens setting information from the OTF data stored in the interchangeable lens, and transmits the read OTF data to the camera body is described in JP2012-505562A.

Further, in WO2009/139118A, a camera system in which a camera body switches between a synchronous mode in which a synchronization signal generated by the camera body is transmitted to an interchangeable lens and an operation of the interchangeable lens is controlled in synchronization with the synchronization signal and an asynchronous mode in which the operation of the interchangeable lens is controlled without synchronization with the synchronous signal generated by the camera body is described.

The camera body described in WO2009/139118A performs switching to the synchronous mode when a video (including a live-view image) is captured, and performs transmission and reception of lens information necessary for auto-focus (AF: Automatic Focus) control or automatic exposure (AE) control in synchronization with the synchronization signal. On the other hand, the camera body performs switching to the asynchronous mode when still image capturing is executed, such that image processing or the like can be focused upon.

SUMMARY OF THE INVENTION

In the invention described in JP2012-58524A, a first transfer path (hot line) separate from a second transfer path through which normal command data communication is performed is provided, and lens information is unidirectionally communicated from the interchangeable lens to the camera body using the first transfer path. Accordingly, the camera body can acquire necessary lens information in a short period. However, since a dedicated transfer path is necessary, there is a problem in that cost increases, and a probability of failure of communication between the camera body and the interchangeable lens increases.

Further, in JP2012-505562A, a technology for transmitting OTF data necessary for point image multi-point processing or a coefficient of a restoration filter calculated from the OTF data from an interchangeable lens to a camera body is described. However, the amount of data from the interchangeable lens to the camera body greatly increases, and such data cannot be transmitted for each frame of a video. That is, the invention described in JP2012-505562A cannot be applied to communication for performing image processing for video recording. In JP2012-505562A, there is no description of a point image restoration process for an image subjected to video recording.

In an invention described in WO2009/139118A, switching to a synchronous mode is performed at the time of video capturing, and position information and a diaphragm value of a focus lens necessary for AF control or AE control are acquired in synchronization with a synchronization signal. However, driving of the lens is also required during video capturing, and it is difficult to acquire the lens information always in synchronization with a synchronization signal. Further, in the invention described in WO2009/139118A, switching to an asynchronous mode is performed when still image capturing is executed so that image processing or the like is focused upon, but image processing at the time of video recording is not considered.

The present invention has been made in view of such circumstances, and an object thereof is to provide a camera system, a camera body, and a communication method capable of acquiring lens information necessary for image processing or the like for a frame of a video from an interchangeable lens in a case in which communication synchronized with a frame of a video is performed at least in a video recording mode, and capable of communication other than communication relating to the acquisition of the lens information.

In order to achieve the above object, an invention according to one aspect of the present invention is a camera system including a camera body and an interchangeable lens freely detachable from the camera body, wherein the interchangeable lens comprises a lens-side communication unit that performs communication with the camera body; and a lens-side control unit that transmits a response signal corresponding to a received request signal from the lens-side communication unit to the camera body in case of receiving the request signal from the camera body via the lens-side communication unit, and the camera body comprises a body-side communication unit that performs communication with the interchangeable lens; and a body-side control unit that transmits a first request signal relating to acquisition of lens information to the interchangeable lens via the body-side communication unit in synchronization with a frame of a video at least in a video recording mode, the body-side control unit limiting the number of transmissions of the first request signal transmitted to the interchangeable lens in a period of one frame of the video.

According to one aspect of the present invention, communication for transmitting the request signal from the camera body to the interchangeable lens in synchronization with the frame of the video in the video recording mode and receiving the response signal from the interchangeable lens is performed, but the number of transmissions of the first request signal relating to the acquisition of the lens information is limited. Accordingly, communication other than the communication relating to the acquisition of the lens information in the period of one frame can be performed.

In a camera system according to another aspect of the present invention, it is preferable that, in a case in which the number of pieces of lens information necessary for image processing in the video recording mode is greater than the limited number of transmissions of the first request signal, the body-side control unit transmits the first request signals having different types to be distributed among a plurality of frame periods. Thus, even in a case in which the lens information necessary for image processing cannot be acquired in a period of one frame, it is possible to acquire the lens information necessary for image processing through a plurality of frame periods.

In a camera system according to yet another aspect of the present invention, the body-side control unit transmits a second request signal relating to lens driving in a period of one frame in which the number of transmissions of the first request signal is limited. Accordingly, it is possible to request the interchangeable lens to perform lens driving in units of frames during video recording. It is understood that the second request signal is not transmitted in a case in which the lens driving is not necessary.

In a camera system according to yet another aspect of the present invention, it is preferable for the body-side control unit to determine a type of first request signal transmitted in synchronization with a frame of a video for each frame. Lens information required by the camera body is different and a priority of the lens information is also different according to a type of interchangeable lens, an operation state of the interchangeable lens, or content of image processing in a video recording mode. Further, a case in which the first request signal is not transmitted for each frame is included. For example, in a case in which the frame rate is 30 fps (frames/second) and 60 fps, the first request signal is transmitted for each frame. However, in a case in which a high frame rate such as 120 fps and 240 fps is set for high image quality of a video, and it is difficult to cope with the high frame rate due to a limit of performance of the lens-side control unit, it is preferable for a transmission frequency of the first request signal to decrease, such as to once in every two frames or once in every three frames. Further, as the case in which the first request signal is not transmitted for each frame, a case in which there is a need to transmit another request signal earlier than the first request signal is considered.

In a camera system according to yet another aspect of the present invention, it is preferable that, in a case where a type of first request signal transmitted in synchronization with a frame of a video is determined for each frame, the body-side control unit determines a priority of each type of lens information, and determines a frequency of the transmission of the first request signal for each type of lens information or an order of the transmission according to the determined priority. For lens information having a high priority, it is preferable that the frequency of the first request signal requesting acquisition of the lens information increases (for example, the acquisition is requested in every frame), or the first request signal is transmitted earlier than other lens information. Further, the priority of each type of lens information is not limited to a case in which the priority is fixed according to each type of lens information, and it is preferable for the priority to be appropriately changed according to a type of interchangeable lens, an operation state of the interchangeable lens, or content of image processing in a video recording mode.

In a camera system according to yet another aspect of the present invention, it is preferable for the body-side control unit to determine a priority for each type of the lens information according to a type of interchangeable lens, an operation state of the interchangeable lens, or content of image processing in a video recording mode. For example, in a case in which the interchangeable lens is a monofocal lens, it is preferable for a lower priority to be assigned to the zoom information, and in a case in which the interchangeable lens is a variable focal length lens, it is preferable for a higher priority to be assigned to the focus position information in order to perform focus adjustment. Further, it is preferable that a lower priority is assigned to the lens information for an optical member (including the diaphragm) that does not operate among the optical members of the interchangeable lens, and the priority of each type of the lens information is determined according to presence or absence of a point image restoration process, or a situation of focus adjustment, exposure control, or the like.

In a camera system according to yet another aspect of the present invention, it is preferable that, in a case in which an interchangeable lens having an optical member driven by a second request signal relating to lens driving from the camera body is mounted, the body-side control unit assigns a low priority to the first request signal for the optical member. This is because the camera body can predict the lens information of the optical member driven by the second request signal.

In a camera system according to yet another aspect of the present invention, it is preferable that, in a case in which an interchangeable lens having an optical member driven on the lens side alone is mounted, the body-side control unit assigns a high priority to the first request signal for the optical member. This is because the camera body cannot recognize the lens information of the optical member driven by the lens side alone if there is no response of the lens information from the interchangeable lens.

In a camera system according to yet another aspect of the present invention, it is preferable that the body-side control unit detects an operation state of the interchangeable lens based on a response signal to a third request signal relating to the acquisition of the lens state, or detects an operation state of the interchangeable lens based on a response signal to a previously received first request signal and a response signal to a current received first request signal, and assigns a lower priority to the first request signal for an optical member that does not operate among respective optical members of the interchangeable lens than to the first request signal for the optical member that operates. The operation state of the interchangeable lens is detected. An optical member that does not operate among optical members of the interchangeable lens is highly likely not to operate in the next frame period, whereas an optical member that operates is highly likely to also operate in the next frame period. Therefore, it is preferable for the priority of the lens information of the optical member that does not operate to be lower than that of the lens information of the optical member that operates.

In a camera system according to yet another aspect of the present invention, it is preferable that, in a case in which a monofocal interchangeable lens is mounted, the body-side control unit assigns a high priority to a first request signal requesting acquisition of a diaphragm value, and does not transmit a first request signal requesting acquisition of the zoom information or assigns a low priority to the first request signal requesting acquisition of the zoom information.

In a camera system according to yet another aspect of the present invention, it is preferable that the body-side control unit changes the limited number of transmissions of a first request signal according to a type of interchangeable lens, an operation state of the interchangeable lens, or content of image processing in a video recording mode. For example, in a case in which the interchangeable lens is a point image restoration process non-compliant lens, the optical member of the interchangeable lens is in operation, and the point image restoration process is not performed or set (OFF state), decreasing the number of transmissions of the first request signal is considered. Further, in a case in which the frame rate is 30 fps, increasing the number of transmissions of the first request signal or releasing the limitation on the number of transmissions may be considered, as compared with the case in which the frame rate of 60 fps.

In a camera system according to yet another aspect of the present invention, it is preferable that the body-side control unit includes a communication mode switching unit that switches between a first communication mode in which transmission and reception of a request signal and a response signal are performed without synchronization with a frame of a video and a second communication mode in which transmission and reception of a request signal and a response signal are performed in synchronization with the frame of the video.

The first communication mode is, for example, a communication mode suitable for a case in which the lens information is acquired regardless of the frame rate, as in a case in which a frame rate is changed according to the brightness of the subject. The second communication mode is a communication mode suitable for a case in which the frame rate is fixed as in the video recording mode and lens information corresponding to the frame of the video is acquired.

In a camera system according to yet another aspect of the present invention, it is preferable for the body-side control unit to switch between the first communication mode and the second communication mode according to a type of interchangeable lens, an operation state of the interchangeable lens, or content of image processing in a video recording mode. For example, in a case in which the interchangeable lens is a point image restoration process non-compliant lens, the optical member of the interchangeable lens is in operation, and the point image restoration process is not performed or set (OFF state), switching to the first communication mode can also be performed in the video recording mode.

In a camera system according to yet another aspect of the present invention, it is preferable that the body-side control unit controls the first request signal based on countermeasure situation information of a point image restoration process using a restoration filter based on a point spread function in a video recording mode.

In a camera system according to yet another aspect of the present invention, the countermeasure situation information of the point image restoration process is at least one of first setting information indicating that the camera body selects a restoration filter based on at least one of diaphragm information, zoom information, and focus position information of the interchangeable lens, and performs a point image restoration process using the selected restoration filter, second setting information indicating that the camera body performs the point image restoration process with respect to any one of different imaging conditions, a different individual lens of the same type, and a different lens type using a sharpening filter that suppresses excessive correction, and third setting information indicating that the camera body does not perform the point image restoration process.

Further, the countermeasure situation information of the point image restoration process is information indicating ON/OFF of the point image restoration process set in the camera body.

An invention according to yet another aspect of the present invention is a camera body from which an interchangeable lens is freely detachable, the camera body comprising: a body-side communication unit that performs communication with the mounted interchangeable lens; and a body-side control unit that transmits a first request signal relating to acquisition of lens information to the interchangeable lens via the body-side communication unit in synchronization with a frame of a video at least in a video recording mode, the body-side control unit limiting the number of transmissions of the first request signal transmitted to the interchangeable lens in a period of one frame of the video.

In a camera body according to yet another aspect of the present invention, it is preferable that, in a case in which the number of pieces of lens information necessary for image processing in the video recording mode is greater than the limited number of transmissions of the first request signal, the body-side control unit transmits the first request signals having different types to be distributed among a plurality of frame periods.

In a camera body according to yet another aspect of the present invention, it is preferable for the body-side control unit to transmit a second request signal relating to lens driving in a period of one frame in which the number of transmissions of the first request signal is limited.

An invention according to yet another aspect of the present invention is a communication method between a camera body and an interchangeable lens mounted on the camera body, wherein the camera body transmits a first request signal relating to acquisition of lens information to the interchangeable lens in synchronization with a frame of a video at least in the video recording mode, the interchangeable lens transmits a response signal to the first request signal to the camera body, and the camera body transmits the first request signal that is transmitted in a period of one frame of the video at least in the video recording mode with the limited number of transmissions of the first request signal. Accordingly, it is possible to perform communication other than communication relating to the acquisition of the lens information in the period of one frame.

In a communication method according to yet another aspect of the present invention, it is preferable that, in a case in which the number of pieces of lens information necessary for image processing in the video recording mode is greater than the limited number of transmissions of the first request signal, the camera body transmits the first request signals having different types to be distributed among a plurality of frame periods.

In a communication method according to yet another aspect of the present invention, it is preferable for the camera body to transmit a second request signal relating to lens driving in a period of one frame in which the number of transmissions of the first request signal is limited.

According to the present invention, since the first request signal relating to acquisition of the lens information is transmitted to the interchangeable lens in synchronization with the frame of the video at least in the video recording mode and, particularly, the number of transmissions of the first request signal transmitted in the period of one frame of the video is limited, it is possible to acquire the lens information necessary for, for example, image processing for the frame of the video, and to perform communication (for example, communication relating to lens driving) other than communication relating to the acquisition of the lens information in the period of one frame.

DESCRIPTION OF THE PREFERRED EMBODIMENTS

Hereinafter, preferred embodiments of a camera system, a camera body, and a communication method according to the present invention will be described with reference to the accompanying drawings.

<Appearance of Camera System>

Figure 1:
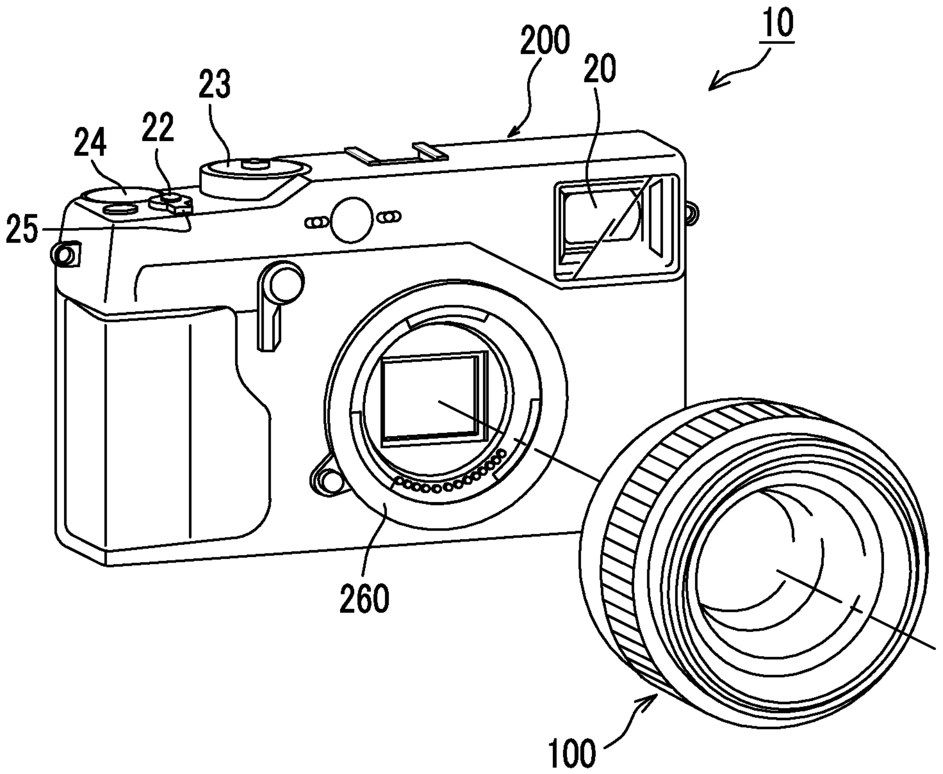
FIG. 1 is a perspective view of a camera system when viewed obliquely from the front according to the present invention.
Figure 2:
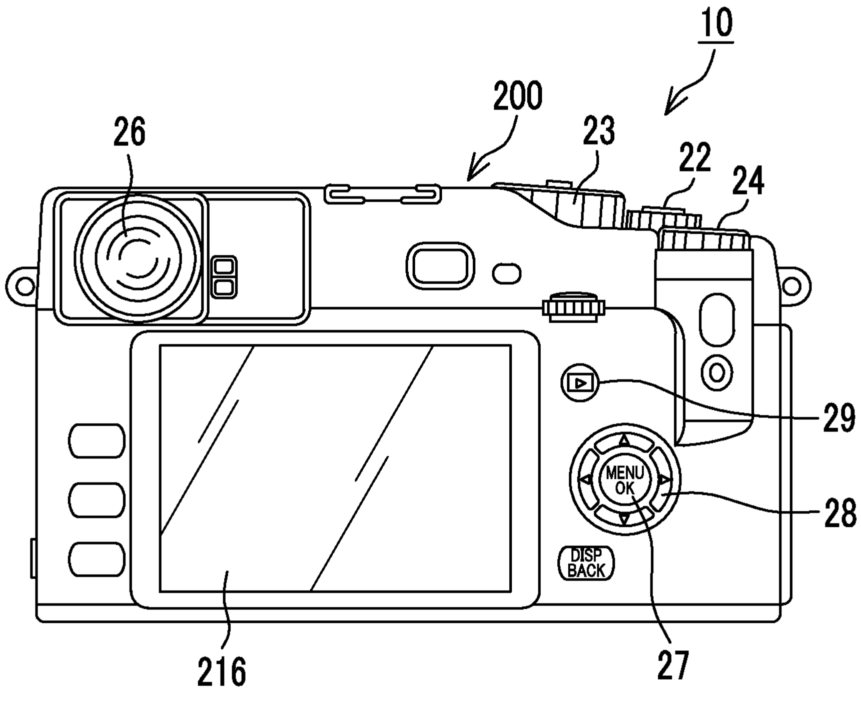
FIG. 2 is a rear view of a camera body.

FIG. 1 is a perspective view of a camera system when viewed obliquely from the front according to the present invention, and FIG. 2 is a rear view of a camera body.

As illustrated in FIG. 1, the camera system (hereinafter referred to as an "imaging device") 10 is a mirrorless digital SLR camera or a digital single-lens reflex camera including an interchangeable lens 100 and a camera body 200 from which the interchangeable lens 100 is freely detachable.

A body mount 260 on which the interchangeable lens 100 is mounted, a finder window 20 of an optical finder, and the like are provided on a front surface of the camera body 200. A shutter release button 22, a shutter speed dial 23, an exposure correction dial 24, and a power lever 25 are mainly provided on an upper surface of the camera body 200.

Further, a monitor 216, an eyepiece portion 26 of the optical finder, an MENU/OK key 27, a cross key 28, a playback button 29, and the like are mainly provided on a rear surface of the camera body 200, as illustrated in FIG. 2.

The monitor 216 functions as a display unit that displays a live view image in an imaging mode, reproduces and displays a captured image in a playback mode, or displays various menu screens. The MENU/OK key 27 is an operation key having both of a function of a menu button for instructing to display a menu on a screen of the monitor 216, and a function of an OK button for instructing a determination and execution of selected content. The cross key 28 is an operation unit that inputs instructions of four directions including up, down, left, and right, and functions as a button for selecting an item from the menu screen or instructing selection of various setting items in respective menus. Further, the up and down keys of the cross key 28 function as a zoom switch at the time of imaging or a playback zoom switch in a playback mode, and left and right keys function as a frame advance (forward/reverse feed) button in the playback mode. The playback button 29 is a button for switching to the playback mode in which a still image or a video that has been captured and recorded is displayed on the monitor 216.

<Internal Configuration of Imaging Device>

Figure 3:
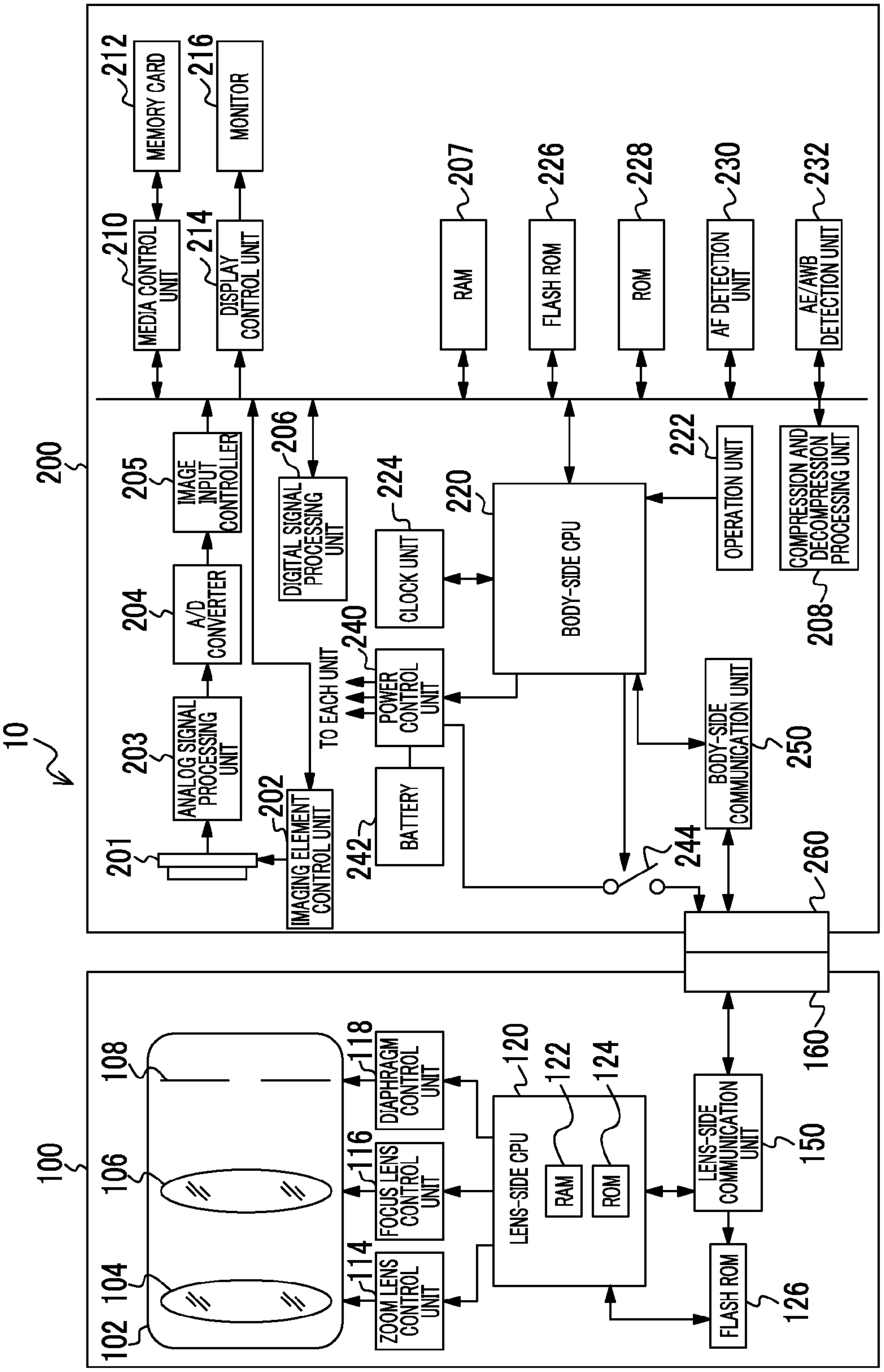
FIG. 3 is a block diagram illustrating an embodiment of an internal configuration of an imaging device.

FIG. 3 is a block diagram illustrating an embodiment of an internal configuration of the imaging device 10.

[Interchangeable Lens]

The interchangeable lens 100 constituting the imaging device 10 includes an imaging optical system 102, a zoom lens control unit 114, a focus lens control unit 116, a diaphragm control unit 118, a lens-side CPU 120 (lens-side control unit), a flash read only memory (ROM) 126, a lens-side communication unit 150 (lens-side communication unit), and a lens mount 160.

The imaging optical system 102 includes a plurality of optical members including a zoom lens 104, a focus lens

106, and a diaphragm 108. The zoom lens control unit 114 controls the zoom position of the zoom lens 104 according to a command from the lens-side CPU 120. The focus lens control unit 116 controls the focus position of the focus lens 106 according to a command from the lens-side CPU 120. The diaphragm control unit 118 controls the diaphragm 108 (diaphragm area) according to a command from the lens-side CPU 120.

The lens-side CPU 120 is a central processing unit of the interchangeable lens 100, and includes a ROM 124 and a RAM 122 built therein.

The flash ROM 126 is a nonvolatile memory that stores, for example, a program downloaded from the camera body 200.

The lens-side CPU 120 collectively controls each unit of the interchangeable lens 100 using the random access memory (RAM) 122 as a work area according to a control program stored in the ROM 124 or the flash ROM 126.

The lens-side communication unit 150 performs communication with the camera body 200 via a plurality of signal terminals (lens-side signal terminals) to be described below provided in the lens mount 160 in a state in which the lens mount 160 is mounted on the body mount 260 of the camera body 200. That is, the lens-side communication unit 150 performs transmission and reception (bidirectional communication) of the request signal and the response signal to and from the body-side communication unit 250 of the camera body 200 connected via the lens mount 160 and the body mount 260 according to a command of the lens-side CPU 120.

Further, the interchangeable lens 100 includes a detector (not shown) that detects lens information of each optical member of the imaging optical system 102 (the zoom information of the zoom lens 104, the focus position information of the focus lens 106, and the diaphragm information). Here, the zoom information is information indicating the zoom position, a zoom magnification, the focal length or the like, and the diaphragm information is information indicating the diaphragm value (F value), an aperture diameter of the diaphragm 108, or the like.

It is preferable for the lens-side CPU 120 to hold various detected lens information in the RAM 122 in order to respond to the request for lens information from the camera body 200. Further, the lens information of each optical member can be detected if there is the request for lens information from the camera body 200, detected when the optical member is driven, or detected at a certain period (a sufficiently shorter period than a frame period of the video), and a result of the detection can be held.

Lens product information, an allowable value indicating a range in which there an influence on the point image restoration, and the like are stored in the ROM 124 as information that the camera body 200 is notified of when the interchangeable lens 100 is mounted. Further, the restoration filter or the point spread function (PSF) applied to the interchangeable lens 100 itself may be stored.

[Camera Body]

The camera body 200 constituting the imaging device 10 includes an imaging element 201, an imaging element control unit 202, an analog signal processing unit 203, an A/D converter 204, an image input controller 205, a digital signal processing unit 206, a RAM 207, a compression and decompression processing unit 208, a media control unit 210, a memory card 212, a display control unit 214, a monitor 216, a body-side CPU 220 (body-side control unit), an operation unit 222, a clock unit 224, a flash ROM 226, a ROM 228, an AF detection unit 230, an AE/AWB detection unit 232, a power control unit 240, a battery 242, a body-side communication unit 250 (body-side communication unit), and a body mount 260.

The imaging element 201 includes a complementary metal-oxide semiconductor (CMOS) type color image sensor. The imaging element 201 is not limited to the CMOS type, and may be an XY address type or a charge coupled device (CCD) type image sensor.

The imaging element 201 is configured with a plurality of pixels arranged in a matrix form in a predetermined pattern array (for example, a BAYER array, G stripe R/G full checkered, an X-TRANS (registered trademark) array, or a honeycomb array). Each pixel includes a micro lens, a red (R), green (G) or blue (B) color filter, and a photoelectric conversion unit (for example, photodiode).

An optical image of the subject formed on a light reception surface of the imaging element 201 by the imaging optical system 102 of the interchangeable lens 100 is converted into an electric signal by the imaging element 201.

The imaging element control unit 202 controls imaging timing, exposure time, or the like of the imaging element 201 according to a command of the body-side CPU 220. The analog signal processing unit 203 performs various analog signal processing on an analog image signal obtained by the imaging element 201 imaging the subject. The analog signal processing unit 203 includes, for example, a sample and hold circuit, a color separation circuit, and a gain adjustment circuit. The A/D converter 204 converts an analog image signal output from the analog signal processing unit 203 into a digital image signal.

When a video or a still image is captured, image data (mosaic image data) of each of RGB pixels output via the imaging element 201, the analog signal processing unit 203, and the A/D converter 204 is input from the image input controller 205 to the RAM 207 and temporarily stored. In a case in which the imaging element 201 is a CMOS-type imaging element, the analog signal processing unit 203 and the A/D converter 204 are often built in the imaging element 201.

The digital signal processing unit 206 performs various digital signal processing on the image data stored in the RAM 207. The digital signal processing unit 206 in this example appropriately reads the image data stored in the RAM 207, performs digital signal processing such as offset processing, a gain control process including white balance correction and sensitivity correction, a gamma correction process, demosaic processing (demosaicing process), an RGB/YC conversion process, and a point image restoration process on the read image data, and stores image data after the digital signal processing in the RAM 207 again. The demosaic processing, the RGB/YC conversion process, and the point image restoration process in the digital signal processing unit 206 will be described in detail below.

The compression and decompression processing unit 208 performs a compression process on uncompressed image data (Y, Cr, Cb) stored in the RAM 207. Further, the compression and decompression processing unit 208 performs a decompression process on the compressed image data.

The media control unit 210 performs control to store the image data compressed by the compression and decompression processing unit 208 in the memory card 212. Further, the media control unit 210 performs control to read the compressed image data from the memory card 212.

The display control unit 214 performs control to display the uncompressed image data stored in the RAM 207 on the monitor 216.

The monitor 216 includes, for example, a display device such as a liquid crystal display device or an organic EL display device.

In a case in which a live view image is displayed on the monitor 216, a digital image signal continuously generated by the digital signal processing unit 206 is temporarily stored in the RAM 207. The display control unit 214 converts the digital image signal temporarily stored in this RAM 207 to have a signal format for a display, and sequentially outputs the resultant signal to the monitor 216. Accordingly, the captured image is displayed on the monitor 216 in real time, such that imaging can be performed using the monitor 216 as an electronic finder.

The shutter release button 22 is operation means for inputting an instruction to start imaging, and is configured as a switch of a 2-step stroke type including so-called “half press” and “full press”.

In the case of a still image capturing mode, when the shutter release button 22 is half-pressed, an S1 ON signal is output, and when the shutter release button 22 is further pressed from the half press to be full-pressed, an S2 ON signal is output. If the S1 ON signal is output, the camera body 200 executes an imaging preparation process such as auto focusing (AF process) or automatic exposure control (AE process), and if the S2 ON signal is output, the camera body 200 executes a capturing process and a recording process for a still image.

Further, in the case of the video capturing mode, if the shutter release button 22 is full-pressed and the S2 ON signal is output, the camera body 200 enters the video recording mode in which recording of the video starts, executes image processing and a recording process of the video. Thereafter, if the shutter release button 22 is full-pressed again and the S2 ON signal is output, the camera body 200 enters a standby state and temporally stops the recording process of the video.

The shutter release button 22 is not limited to the form of the switch of a 2-step stroke type including half press and full press, but may output the S1 ON signal or the S2 ON signal through onetime operation, or individual switches may be provided to output the S1 ON signal or the S2 ON signal.

Further, in a form in which an operation instruction is performed by a touch panel or a like, operating means may output the operation instruction by touching an area corresponding to the operation instruction displayed on a screen of the touch panel. A form of the operating means is not limited thereto as long as the operating means instructs the imaging preparation process or the imaging process.

A still image or a video acquired by imaging is compressed in a predetermined compression format (for example, a JPEG format for a still image or H264 for a video) in the compression and decompression processing unit 208. The compressed image data is converted into an image file to which necessary ancillary information such as imaging date and time or imaging conditions is added, and then, the image file is stored in the memory card 212 via the media control unit 210.

The body-side CPU 220 performs entire control of an entire operation of the camera body 200, driving of an optical member of the interchangeable lens 100, and the like, and controls each unit of the camera body 200 and the interchangeable lens 100 based on an input from, for example, the operation unit 222 including the shutter release button 22.

The clock unit 224 is a timer and measures time based on a command from the body-side CPU 220. Further, the clock unit 224 is a calendar and measures current date and time.

The flash ROM 226 is a readable and writable non-volatile memory, and stores setting information.

A camera control program executed by the body-side CPU 220, defect information of the imaging element 201, and various parameters or tables used for image processing or the like are stored In the ROM 228. The body-side CPU 220 controls each unit of the camera body 200 and the interchangeable lens 100 using the RAM 207 as a work area according to the camera control program stored in the ROM 228.

Further, a restoration filter generated corresponding to the point spread function (PSF) of the interchangeable lens 100 is stored in the flash ROM 226 or the ROM 228. The restoration filter may be stored in advance according to a type of interchangeable lens, the restoration filter of the interchangeable lens may be acquired from the mounted interchangeable lens through communication, or the restoration filter may be downloaded from a network.

The AF detection unit 230 calculates a numerical value necessary for autofocus (AF) control based on the digital image signal. In the case of so-called contrast AF, for example, an integration value (focus evaluation value) of a high frequency component of a G signal in a predetermined AF area is calculated. The body-side CPU 220 moves the focus lens 106 to a position in which the focus evaluation value is maximized (that is, a position in which the contrast is maximized). AF is not limited to the contrast AF. For example, phase difference AF may be performed to detect the amount of defocus based on pixel data of a phase difference detection pixel provided in the imaging element and move the focus lens 106 so that this defocus amount becomes zero.

The AE/AWB detection unit 232 calculates a numerical value necessary for automatic exposure (AE) control and automatic white balance (AWB) control based on the digital image signal. The body-side CPU 220 calculates brightness of the subject (subject luminance) based on the numerical value obtained from the AE/AWB detection unit 232, and determines the diaphragm value and the shutter speed from a predetermined program diagram.

The power control unit 240 applies a power supply voltage supplied from the battery 242 to each unit of the camera body 200 according to a command of the body-side CPU 220. Further, the power control unit 240 applies the power supply voltage supplied from the battery 242 to each unit of the interchangeable lens 100 via the body mount 260 and the lens mount 160 according to a command of the body-side CPU 220.

The lens power switch 244 performs switching between ON and OFF and switching between levels of the supply voltage applied to the interchangeable lens 100 via the body mount 260 and the lens mount 160 according to a command of the body-side CPU 220.

The body-side communication unit 250 performs transmission and reception (bidirectional communication) of the request signal and the response signal to and from the lens-side communication unit 150 of the interchangeable lens 100 which is connected via the body mount 260 and the lens mount 160 according to a command of the body-side CPU 220.

[Embodiment of Communication Unit]

Figure 4:
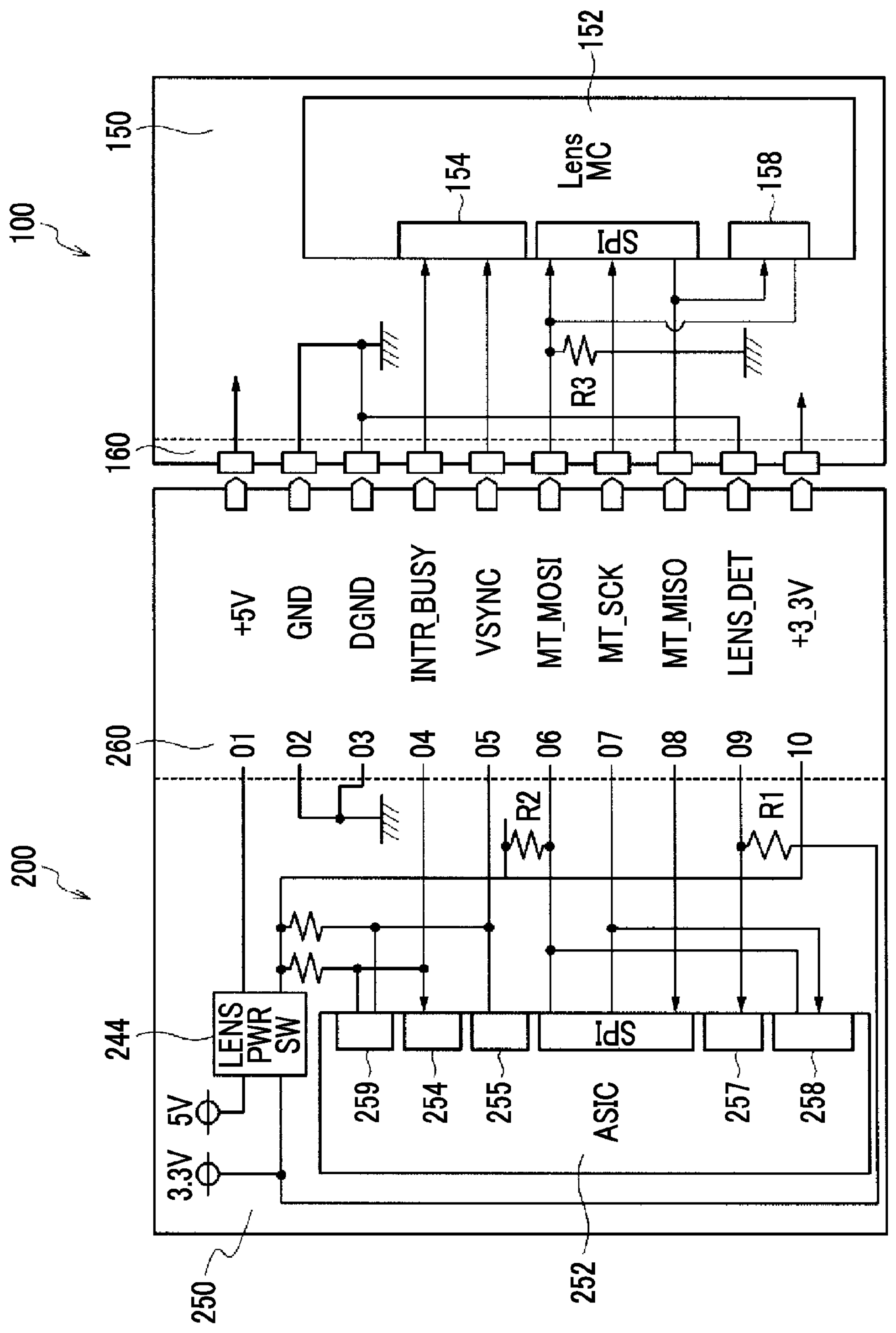
FIG. 4 is an illustrative diagram illustrating a body mount, a lens mount, and peripheral portions thereof.

FIG. 4 is a diagram illustrating the body mount 260, the lens mount 160, and peripheral portions thereof. In a state in which the lens mount 160 is mounted on the body mount 260, the plurality of terminals (10 terminals with numbers "01" to "10" of FIG. 4 in this example) of the body mount 260 are abutted on the plurality of terminals of the lens mount 160, respectively.

A first terminal (+5 V terminal) of the body mount 260 is a first body-side power supply terminal for applying a +5 V voltage of the battery 242 from the camera body 200 to the interchangeable lens 100. The first terminal (+5 V terminal) of the body mount 260 is connected to the power control unit 240 and the battery 242 via the lens power switch 244.

A second terminal (GND terminal) and a third terminal (DGND terminal) of the body mount 260 are body-side ground terminals for applying a 0 V (ground voltage) from the camera body 200 to the interchangeable lens 100. The second terminal and the third terminal are connected to a ground of the camera body 200.

Fourth to eighth terminals of the body mount 260 are a plurality of body-side signal terminals for signal transmission and reception to and from the interchangeable lens 100.

The fourth terminal (INTR_BUSY signal terminal) of the body mount 260 is a body-side busy signal terminal for notification of an INTR_BUSY signal indicating a period of a specific operation of the interchangeable lens 100 or the camera body 200.

The fifth terminal (VSYNC signal terminal) of the body mount 260 is a body-side signal terminal for synchronization between the camera body 200 and the interchangeable lens 100, and transmits a vertical synchronization signal (VSYNC) of the imaging element 201 to the interchangeable lens 100.

The sixth terminal (MT_MOST signal terminal), the seventh terminal (MT_SCK signal terminal), and the eighth terminal (MT_SIMO signal terminal) of the body mount 260 are body-side communication signal terminals for three-wire serial communication between the camera body 200 and the interchangeable lens 100.

An MT_MOSI signal is a signal that is transmitted from the camera body 200 as a master and received by the interchangeable lens 100 as a slave. An MT_SCK signal is a clock signal applied from the camera body 200 as a master to the interchangeable lens 100 as a slave. An MT_SIMO signal is a signal transmitted from the interchangeable lens 100 as a slave and received by the camera body 200 as a master.

A ninth terminal (LENS_DET terminal) of the body mount 260 is a body-side terminal for only detection of the interchangeable lens 100. A tenth terminal (+3.3 V terminal) of the body mount 260 is a power supply terminal for applying a +3.3 V voltage of the battery 242 from the camera body 200 to the interchangeable lens 100.

The ninth terminal (LENS_DET terminal) of the body mount 260 is connected to the power control unit 240 and the battery 242 via a pull-up resistor R1. Further, the sixth terminal (MT_MOSI signal terminal) among the plurality of signal terminals (fourth to eighth terminals) for signal transmission and reception (communication) of the body mount 260 is connected to the battery 242 via a pull-up resistor R2 and the lens power switch 244.

The pull-up resistor R2 is connected to the lens power switch 244, and the sixth terminal (MT_MOST signal terminal) is not pulled up in a state in which the lens power switch 244 is turned off (a state in which the interchangeable lens 100 is not powered on). In a state in which the lens power switch 244 is turned on by the body-side CPU 220 (a state in which the interchangeable lens 100 is powered on), the sixth terminal (MT_MOSI signal terminal) is pulled up. That is, when the power lever 25 of the camera body 200 is simply turned on, a voltage of the sixth terminal (MT_MOSI signal terminal) of the interchangeable lens 100 does not become a high level, and only when the lens power switch 244 is turned on by the body-side CPU 220, the voltage of the sixth terminal (MT_MOSI signal terminal) of the interchangeable lens 100 becomes a high level. Accordingly, malfunction of Lens MC 152 (Integrated Circuit) on the interchangeable lens 100 side is prevented.

The body-side CPU 220 of the camera body 200 sets only the ninth terminal (LENS_DET terminal) as a determination target before pre-power is supplied to the interchangeable lens 100 via the body-side power supply terminal of the body mount 260, and determines whether the ninth terminal (LENS_DET terminal) is at a low level. In a case in which it is determined that the LENS_DET terminal is at a low level, the body-side CPU 220 supplies the pre-power to the lens unit via the body-side power supply terminal of the body mount 260, and then, determines whether or not both of the LENS_DET terminal and the sixth terminal (MT_MOSI signal terminal) at the time of non-communication are at a low level.

The ninth terminal (LENS_DET terminal) of the lens mount 160 is connected to ground (GND terminal and DGND terminal). Further, the sixth terminal (MT_MOSI signal terminal) among the plurality of signal terminals (fourth to eighth terminals) of the lens mount 160 is connected to the ground via a pull-down resistor R3, which has a sufficiently smaller resistance value than the pull-up resistor R2.

The body-side CPU 220 as a mounting determination unit determines whether or not the lens mount 160 is mounted on the body mount 260 (that is, determines whether or not the interchangeable lens 100 is mounted on the camera body 200) based on the voltage (high/low level) of the ninth terminal (LENS_DET terminal) of the body mount 260 and the voltage (high/low level) of the specific body-side signal terminal (MT_MOST signal terminal in this example) at the time of non-communication. Specifically, the body-side CPU 220 determines that the interchangeable lens 100 is mounted on the body mount 260 when both the voltage of the LENS_DET terminal and the voltage of the MT_MOSI signal terminal at the time of non-communication of the camera body 200 become at a low level.

An ASIC 252 (integrated circuit) constituting the body-side communication unit 250 includes a terminal 254 for detecting a change (high/low) in a potential of the fourth terminal (INTR_BUSY signal terminal) of the body mount 260, a terminal 255 for applying a synchronization signal to the fifth terminal (VSYNC signal terminal) of the body mount 260, an interface SPI for three-wire serial communication using the sixth to eighth terminals (hereinafter also referred to as "communication signal terminals") of the body mount 260, a terminal 257 for detecting a change (high/low) in a potential of the ninth terminal (LENS_DET terminal) of the body mount 260, and terminals 258 and 259 for updating firmware of the interchangeable lens 100.

A Lens MC 152 (integrated circuit) constituting the lens-side communication unit 150 includes a terminal 154 for detecting a change in a potential of the fourth terminal (INTR_BUSY signal terminal) of the lens mount 160, an interface SPI for three-wire serial communication using the sixth to eighth terminals (communication signal terminals) on the lens side of the lens mount 160, and a terminal 158 for updating the firmware of the interchangeable lens 100.

[Communication Method]

Next, a communication method according to the present invention will be described.

Figure 5:
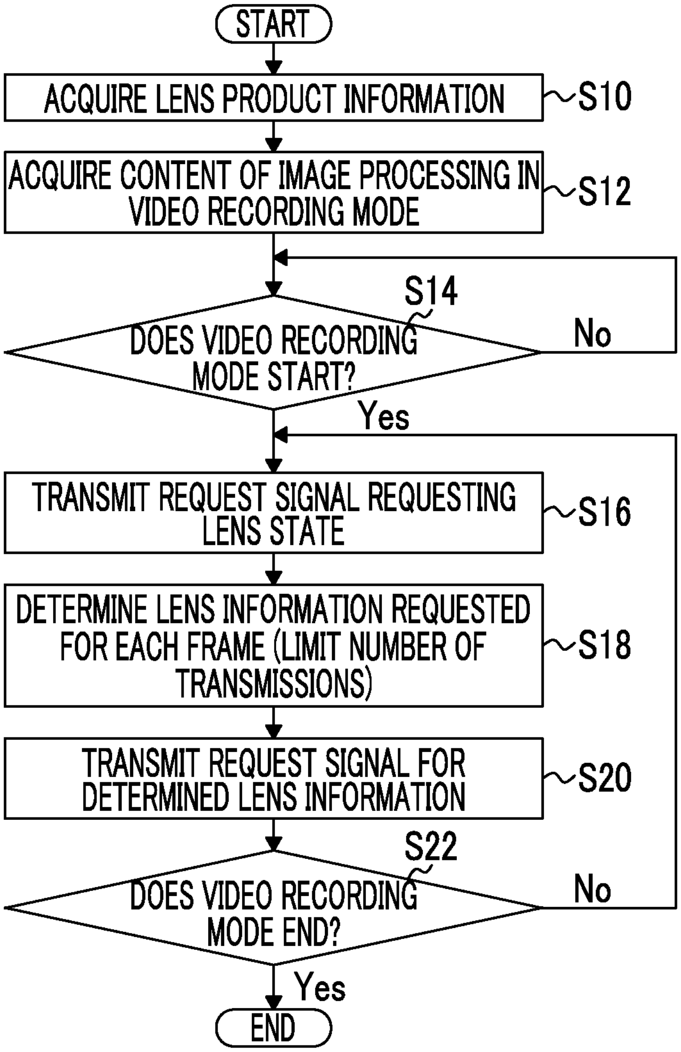
FIG. 5 is a flowchart illustrating a flow of a process including a communication method according to the present invention.

FIG. 5 is a flowchart illustrating a flow of a process including a communication method according to the present invention.

As illustrated in FIG. 5, when the interchangeable lens 100 is mounted, the body-side CPU 220 acquires lens product information of the interchangeable lens 100 through three-wire serial communication (step S10). That is, the body-side CPU 220 transmits a request signal requesting the lens product information to the interchangeable lens 100 via the body-side communication unit 250, and the lens-side CPU 120 of the interchangeable lens 100 receiving the request signal transmits a response signal indicating the lens product information to the camera body 200 via the lens-side communication unit 150. The lens product information is stored in the ROM 124.

Accordingly, the body-side CPU 220 can recognize a type of mounted interchangeable lens. By recognizing the type of interchangeable lens, the body-side CPU 220 can recognize whether the interchangeable lens is a monofocal lens or a zoom lens. Further, in a case in which the interchangeable lens is the zoom lens, the body-side CPU 220 can recognize whether the zoom lens is a type in which a focus position changes (variable focus lens (varifocal lens)) or a type in which the focus position does not change from a zoom operation. Further, the body-side CPU 220 can recognize whether the interchangeable lens is a lens in which the zoom lens, the focus lens, or the diaphragm can be manually operated, or particularly, whether or not the interchangeable lens is driven based on a lens driving instruction from the camera body 200 in a case in which the interchangeable lens can be manually operated. Further, the body-side CPU 220 can recognize whether the interchangeable lens is a lens corresponding to the point image restoration process (point image restoration process compliant lens/point image restoration process non-compliant lens).

Then, the body-side CPU 220 acquires content of image processing in the video recording mode (step S12). For example, in a case in which various settings are performed on the menu screen using, for example, the MENU/OK key 27, the cross key 28, and the monitor 216, the body-side CPU 220 acquires information on whether the point image restoration process using the restoration filter based on the point spread function is performed (point image restoration process ON/OFF), and information on whether the sharpening filter of which the restoration strength is weak and that is capable of reducing excessive correction is used in place of the restoration filter, from the flash ROM 226 or the like as the content of the image processing in the video recording mode. Further, the body-side CPU 220 acquires an allowable value indicating a range in which there is an influence on the point image restoration, for each lens type of interchangeable lens.

Then, the body-side CPU 220 determines whether or not the video recording mode starts (step S14). That is, if the imaging device 10 is set to the video capturing mode and the S2 ON signal indicating the full press of the shutter release button 22 is input from the operation unit 222 in the standby state, the body-side CPU 220 sets the video recording mode. If the video recording mode is set, the body-side CPU 220 performs capturing of each frame of the video at a preset frame rate (30 fps or 60 fps), and instructs each unit to perform signal processing and a recording process on each captured frame. Further, in this example, a process in the following steps S16 to S22 is performed on each frame.

First, if the video recording mode is set, the body-side CPU 220 transitions to a communication mode of a synchronization-signal synchronization type communication mode (hereinafter referred to as "synchronous communication mode" (second communication mode)) synchronized with the synchronization signal VSYNC of the imaging element 201.

Figure 6:
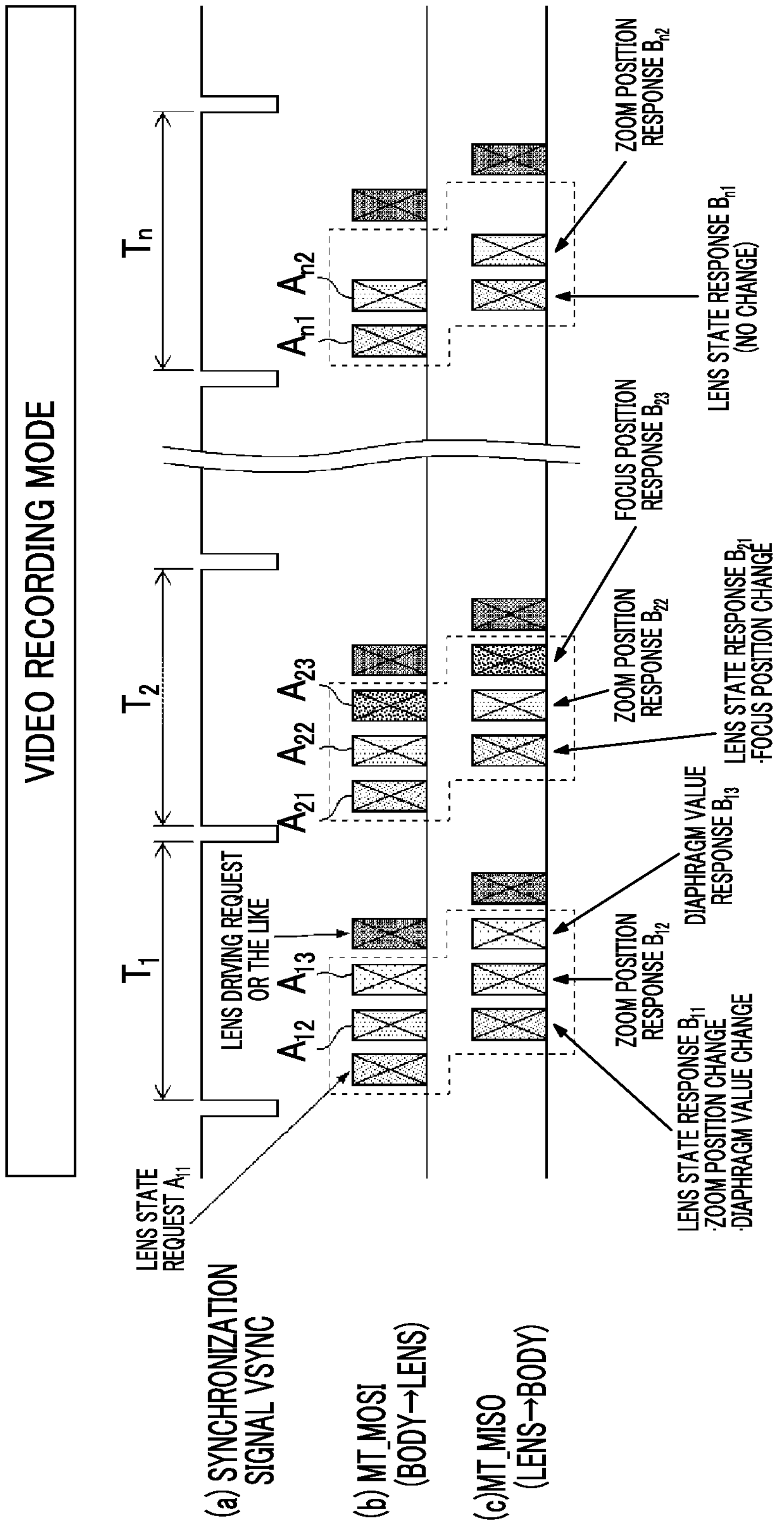
FIG. 6 is a timing chart illustrating a first embodiment of a communication method in a synchronous communication mode according to the present invention.

FIG. 6 is a timing chart illustrating a first embodiment of a communication method in the synchronous communication mode according to the present invention.

This synchronous communication mode is a new communication mode adopted in the video recording mode, and a communication format in which a response to a request from the camera body 200 is performed in synchronization with the synchronization signal VSYNC ((a) of FIG. 6). This synchronous communication mode is a communication mode in which the number of transmissions of the request signal (first request signal) relating to acquisition of various lens information in units of frames is limited.

Here, the request signal (first request signal) relating to the acquisition of the lens information is considered to refer to a request signal requesting the interchangeable lens 100 to provide the zoom position, the focus position, or the diaphragm value (a request signal relating to the acquisition of the lens information of a narrow sense) and refer to a request signal relating to the acquisition of lens information of a broad sense, which includes the request signal relating to the acquisition of the lens information of the narrow sense and a request signal (third request signal) requesting a lens state for confirming a lens state (presence or absence of a change in the state) of the interchangeable lens 100, and either of the request signals may be used.

In the example illustrated in FIG. 5, a case of the request signal relating to the acquisition of lens information of the broad sense is shown, and the number of transmissions of the request signal relating to the acquisition of the lens information is limited to 3 or smaller.

A reason for limitation on the number of transmissions of the request signal relating to the acquisition of the lens information is that communication for performing lens driving while acquiring all of lens information necessary for image processing (point image restoration process) for each frame in a limited time of frame units is likely to be difficult.

By limiting the number of transmissions of the request signal relating to the acquisition of the lens information that is transmitted in a period of one frame as above, time for transmission of a request signal (second request signal) relating to lens driving such as a lens driving request other than the acquisition of the lens information, and reception of a response signal is ensured.

Further, as a result of limiting the number of transmissions of the request signal relating to the acquisition of the lens information that is transmitted in a period of one frame, all of lens information necessary for the point image restoration process or the like may not be acquired for each frame. In this case, by transmitting request signals for different types of lens information to be distributed among a plurality of frame periods, all of the lens information can be acquired. Further, it is preferable that a priority is determined for each type of lens information, and a frequency of the transmission of the request signal or an order of the transmission is determined for each piece of lens information according to the determined priority.

In the example illustrated in FIG. 6, for three pieces of lens information including the zoom position, focus position, and the diaphragm value, since the number of transmissions of request signals relating to the acquisition of the lens information (including a request signal (third request) relating to acquisition of a lens state (presence or absence of change)) is smaller than or equal to 3, types of lens information that can be required in a period of one frame is smaller than or equal to 2.

In the example illustrated in FIG. 6, among the zoom position, the focus position, and the diaphragm value, a highest priority is assigned to the zoom position, and a request signal for the zoom position is transmitted in every frame. Request signals for the focus position and the diaphragm value are transmitted only when particularly necessary (for example, when there is a change).

That is, as illustrated in (b) and (c) of FIG. 6, in a case in which a response signal $B_{11}$ of a lens state to a request signal $A_{11}$ for a lens state request in a frame period $T_1$ indicates "zoom position change and diaphragm value change", request signals $A_{12}$ and $A_{13}$ requesting the zoom position and the diaphragm value are then sequentially transmitted, and response signals $B_{12}$ and $B_{13}$ of the zoom position and the diaphragm value are received.

Further, in a case in which a response signal $B_{21}$ of a lens state to a request signal $A_{21}$ for a lens state request in a frame period $T_2$ indicates "focus position change", request signals $A_{22}$ and $A_{23}$ requesting the zoom position and the focus position are then sequentially transmitted, and response signals $B_{22}$ and $B_{23}$ of the zoom position and the focus position are received.

On the other hand, in a case in which a response signal $B_{n1}$ of a lens state to a request signal $A_{n1}$ requesting a lens state in a frame period $T_n$ indicates "no change", a request signals $A_{n2}$ requesting the zoom position is then transmitted, and a response signal $B_{n2}$ of the zoom position is received.

In the above example, the request signal for the zoom position is transmitted in every frame regardless of the change in the lens state, and a request signal for a changed optical member is preferentially transmitted as the other request signal that can be transmitted in a period of one frame.

A reason for preferential transmission of the request signal for a changed optical member is that the lens information already acquired in the camera body 200 can be used for lens information of an unchanged optical member.

Further, in a case in which the response of the lens state indicates that the zoom position does not change and the focus position and the diaphragm value change, the request signal requesting the zoom position may not be transmitted, and the request signals requesting the focus position and the diaphragm value may be transmitted.

Further, in a case in which the response of the lens state indicates that all of the zoom position, the focus position, and the diaphragm value are changed, it is preferable that the request signal requesting the zoom position is transmitted in every frame, and the request signals requesting the focus position and the diaphragm value are transmitted alternately in every other frame.

Referring back to FIG. 5, in step S16, the body-side CPU 220 transmits a request signal requesting the lens state (presence or absence of a change) immediately after the synchronization signal VSYNC (see (b) of FIG. 6).

Then, the body-side CPU 220 determines the lens information requested for each frame (step S18). In this case, since the number of transmissions of the request signal relating to the lens information to be transmitted in a period of one frame is limited, the body-side CPU 220 determines the lens information requested in a limited range of the number of transmissions.

When the lens information is determined, it is preferable for the lens information to be determined based on a result of the response signal of the lens state to the request signal requesting the lens state transmitted in step S16, as described with reference to FIG. 6. Further, it is preferable for the lens information requested for each frame to be determined in consideration of, for example, the lens product information acquired in step S10 and content of image processing in the video recording mode acquired in step S12. Details of a determination method of determining the lens information (the priority of the lens information) requested for each frame based on the lens product information or the like will be described below.

The body-side CPU 220 transmits a request signal for the lens information determined in step S18 to the interchangeable lens 100 via the body-side communication unit 250 (step S20). Since the response signal to the transmitted request signal for the lens information is transmitted from the lens-side CPU 120 of the interchangeable lens 100 to the camera body 200 via the lens-side communication unit 150, the body-side CPU 220 can acquire the requested lens information.

Then, the body-side CPU 220 determines whether or not the video recording mode ends (step S22). This determination can be performed according to whether the S2 ON signal indicating the full press of the shutter release button 22 is input in the video recording mode.

If the body-side CPU 220 determines that the video recording mode does not end ("No"), the process returns to step S16, and the process from step S16 to step S22 is repeatedly performed again. It is understood that the process from step S16 to step S22 is performed in a period of one frame in synchronization with the frame of the video.

on the other hand, if the body-side CPU 220 determines that the video recording mode ends ("Yes"), the video capturing and recording end and the process transitions to the standby state.

[Digital Signal Processing]

Next, digital signal processing including the point image restoration process for each frame of the video will be described.

Figure 7:
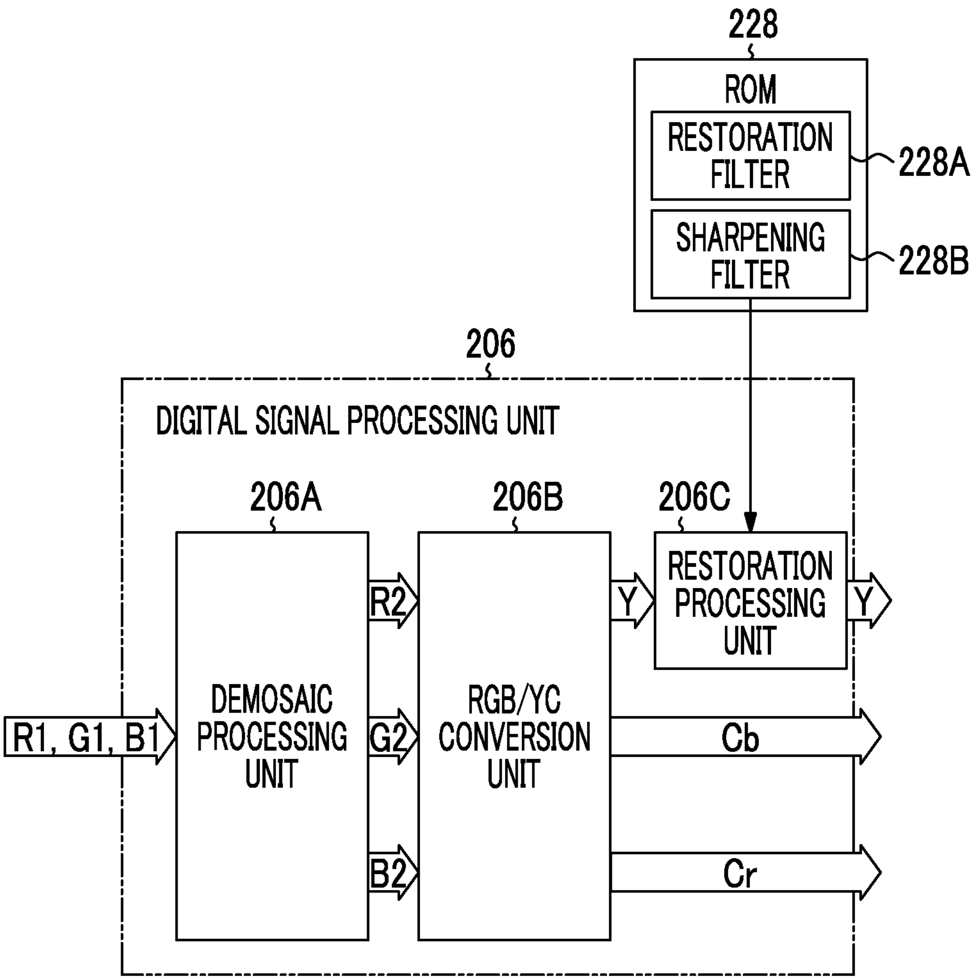
FIG. 7 is a main block diagram illustrating an embodiment of a digital signal processing unit of a camera body illustrated in FIG. 3.

FIG. 7 is a main block diagram illustrating an embodiment of the digital signal processing unit 206 of the camera body 200 illustrated in FIG. 3.

As illustrated in FIG. 7, the digital signal processing unit 206 mainly includes a demosaic processing unit 206A, an RGB/YC conversion unit 206B, and a restoration processing unit 206C. The digital signal processing unit 206 also includes a processing unit that performs a white balance correction process, a gamma correction process, a contour enhancement process, or the like, but the processing unit is not illustrated or described.

The demosaic processing unit 206A is a unit that performs demosaic processing. Here, the demosaic processing is a process of calculating all color information for each pixel from a mosaic image corresponding to a color filter array of a single-plate color imaging element, and is also referred to as a synchronization process. For example, in the case of an imaging element including color filters for three colors RGB, the demosaic processing is a process of calculating color information of all RGB for each pixel from a mosaic image including RGB.

Image data R1, G1, and B1 for the respective RGB colors obtained by imaging in the imaging element 201 are input to the demosaic processing unit 206A. The demosaic processing unit 206A performs the demosaic processing on the input image data R1, G1, and B1 to generate RGB image data R2, G2, and B2 including color data of three planes of RGB.

The RGB/YC conversion unit 206B performs an RGB/YC conversion process on the RGB image data R2, G2, and B2 input from the demosaic processing unit 206A to generate luminance data Y and chrominance data Cb and Cr. The luminance data Y is generated, for example, according to an equation [Y=0.3R+0.6G+0.1B]. Here, while an example in which the luminance data Y is a value of a luminance signal of a color space represented by "Y, Cb, Cr" will be described, but the luminance data Y is not particularly limited as long as the data is data contributing to the luminance of the image, and refers to various data having information on luminance of a captured image. For example, the luminance data Y may include data representing brightness in a CIELAB color space, data with a highest contribution rate for obtaining the luminance signal, or data corresponding to a color filter of a color that most contributes to the luminance.

The restoration processing unit 206C reads a restoration filter 228A and a sharpening filter 228B stored in the ROM 228, and performs a restoration process on the luminance data Y using the restoration filter 228A and the sharpening filter 228B. This restoration process is performed only on the luminance data Y of which visual effects become great so as to reduce a load on a calculation process. By performing the restoration process, blurring of the image is corrected.

The restoration filter 228A is a filter that is generated to be one ideal point after restoration when a high resolution image is restored from a degraded image that is degraded due to aberrations or the like of the imaging optical system, and can be obtained using the PSF of the imaging optical system.

Since the PSF is changed due to the diaphragm value (F value), the angle of view (image height), a zoom magnification, a subject distance, a type of lens, or the like, a large number of restoration filters 228A are prepared.

Meanwhile, the sharpening filter 228B is a moderate filter, and is a filter of which the effects of point image restoration are small (that does not easily generate artifacts). The following filters may be used.

(1) A contour enhancement filter that performs moderate contour enhancement.

(2) A restoration filter in which a modulation transfer function (MTF) after restoration does not exceed 1.0 (in the case of the restoration filter 228A for luminance data Y, MTF after restoration exceeds 1.0 according to a RGB color).

(3) A zero phase filter (including a filter including no movement of an image that depends on a frequency, and a restoration filter that does not perform phase restoration)

(4) A restoration filter created to correspond to a PSF in an area in which aberration of an optical system is smallest.

(5) A filter that has a smooth frequency characteristic and a great filter coefficient concentrated near a center of a kernel, and that does not easily cause ringing.

The sharpening filter 228B is not limited to those listed above, and may be any filter as long as the filter has a lower restoration strength than the restoration filter 228A.

In a case in which the sharpening filter 228B is used, excessive correction is reduced, and accordingly, degradation of image quality due to the excessive correction is reduced even when an imaging condition assumed by the filter and an actual imaging condition is slightly different. Accordingly, an acquisition frequency of the lens information can decrease, and a transmission frequency of the request signal for the lens information can decrease (the lens driving may be preferentially performed).

Further, since the sharpening filter 228B can reduce the excessive correction for an image of which the restoration strength is weak and the blurring is great, the same filter may be used for different imaging conditions (a diaphragm value, a zoom magnification, and a subject distance). Further, the same filter may also be used for different angles of view (image heights). Further, the same filter also may be used for types of the lens or the same filter also may be used for different individual lens of the same type.

Further, the point image restoration process in the restoration filter 228A and the point image restoration process (sharpening process) in the sharpening filter 228B that suppresses the excessive correction can be switched by a user setting a menu in the camera body.

[Restoration Process]

The restoration processing unit 206C is a unit that performs the restoration process on the luminance data Y applied from the RGB/YC conversion unit 206B. Another input is applied from the restoration filter 228A or the sharpening filter 228B read from the ROM 228. Here, in a case in which the restoration processing unit 206C performs a normal point image restoration process, the restoration processing unit 206C reads the restoration filter 228A from the ROM 228, and in a case in which the restoration processing unit 206C weakens strength of the point image restoration process, the restoration processing unit 206C reads the sharpening filter 228B from the ROM 228.

The restoration filter 228A is, for example, a restoration filter that is configured with a deconvolution kernel having a kernel size of 7×7 (corresponding to a tap number of M=7 and N=7), and a calculation coefficient corresponding to the deconvolution kernel (corresponding to restoration gain data and a filter coefficient) and is generated based on a point spread function (PSF) corresponding to imaging conditions (for example, a diaphragm value (F value), an angle of view (image height), a zoom magnification, and a subject distance) of the interchangeable lens. Specifically, $PSF_R(x, y)$, $PSF_G(x, y)$, and $PSF_B(x, y)$ of RGB of the interchangeable lens are combined using an appropriate weighting coefficient to create $PSF_Y(x, y)$ for the luminance data Y, and a restoration filter for performing the restoration process on the luminance data Y is generated using $PSF_Y(x, y)$. Here, (x, y) indicates an in-screen position of the imaging element 201. The kernel size of the deconvolution kernel is not limited to 7×7, and a deconvolution kernel of various sizes can be applied.

In general, a convolution Wiener filter may be used to restore blurring using the PSF. A frequency characteristic d(ωx, ωy) of the restoration filter can be calculated using the following equation by referring to information on an optical transfer function (OTF) obtained by performing Fourier transform on $PSF_Y(x, y)$ and a signal-to-noise ratio (SN ratio).

$$d(\omega_x, \omega_y) = \frac{H^*(\omega_x, \omega_y)}{\|H(\omega_x, \omega_y)\|^2 + 1/SNR(\omega_x, \omega_y)} \quad \text{[Equation 1]}$$

Here, $H(\omega_x, \omega_y)$ indicates OTF, and $H^*(\omega_x, \omega_y)$ indicates a complex conjugate. Further, $SNR(\omega_x, \omega_y)$ indicates the SN ratio.

The design of the filter coefficient of the restoration filter has an optimization problem in that a coefficient value is selected so that frequency characteristics of the filter become closest to desired Wiener frequency characteristics, and the filter coefficient is appropriately calculated by any known scheme.

In this example, the restoration filter 228A created as described above is stored in the ROM 47.

Since the PSF is changed according to the diaphragm value (F value), the angle of view (image height), the zoom magnification, a subject distance, a type of lens, or the like, a large number of restoration filters 228A are prepared.

In a case in which the restoration processing unit 206C performs the point image restoration process on each frame of the video in the video recording mode, the restoration processing unit 206C reads, from the ROM 228, the restoration filter 228A corresponding to the type of interchangeable lens, the diaphragm information (diaphragm value) acquired from the interchangeable lens 100 in synchronization with the frame of the video, the zoom information (zoom magnification), the focus position (subject distance), and an in-screen position (image height) of the luminance data Y to be subjected to the restoration process, based on such information, as described above.

The restoration processing unit 206C performs a convolution operation of the luminance data of a kernel size of 7×7 including the luminance data Y of a restoration process target and the restoration filter 228A read from the ROM 228, and outputs the luminance data Y subjected to the restoration process which is a result of the operation.

Further, in a case in which the point image restoration process is weakened, the restoration processing unit 206C reads the sharpening filter 228B of which the restoration strength is weak and that is capable of reducing excessive correction from the ROM 228, and performs the restoration process using the sharpening filter 228B. Accordingly, even when the restoration process is performed on the frame of the video that is not in a focusing state, it is possible to prevent the image quality from being degraded due to the excessive correction.

In this case, the restoration process may also be performed using the sharpening filter 228B common to a plurality of imaging conditions without depending on the respective imaging conditions (for example, diaphragm value, zoom magnification, and subject distance) of the interchangeable lens.

In a case in which the interchangeable lens is a point image restoration process non-compliant lens or in a case in which the point image restoration process is set to OFF, the restoration processing unit 206C directly outputs the luminance data Y applied from the RGB/YC conversion unit 206B without performing the restoration process using the restoration filter 228A and the sharpening filter 228B.

Figure 8:
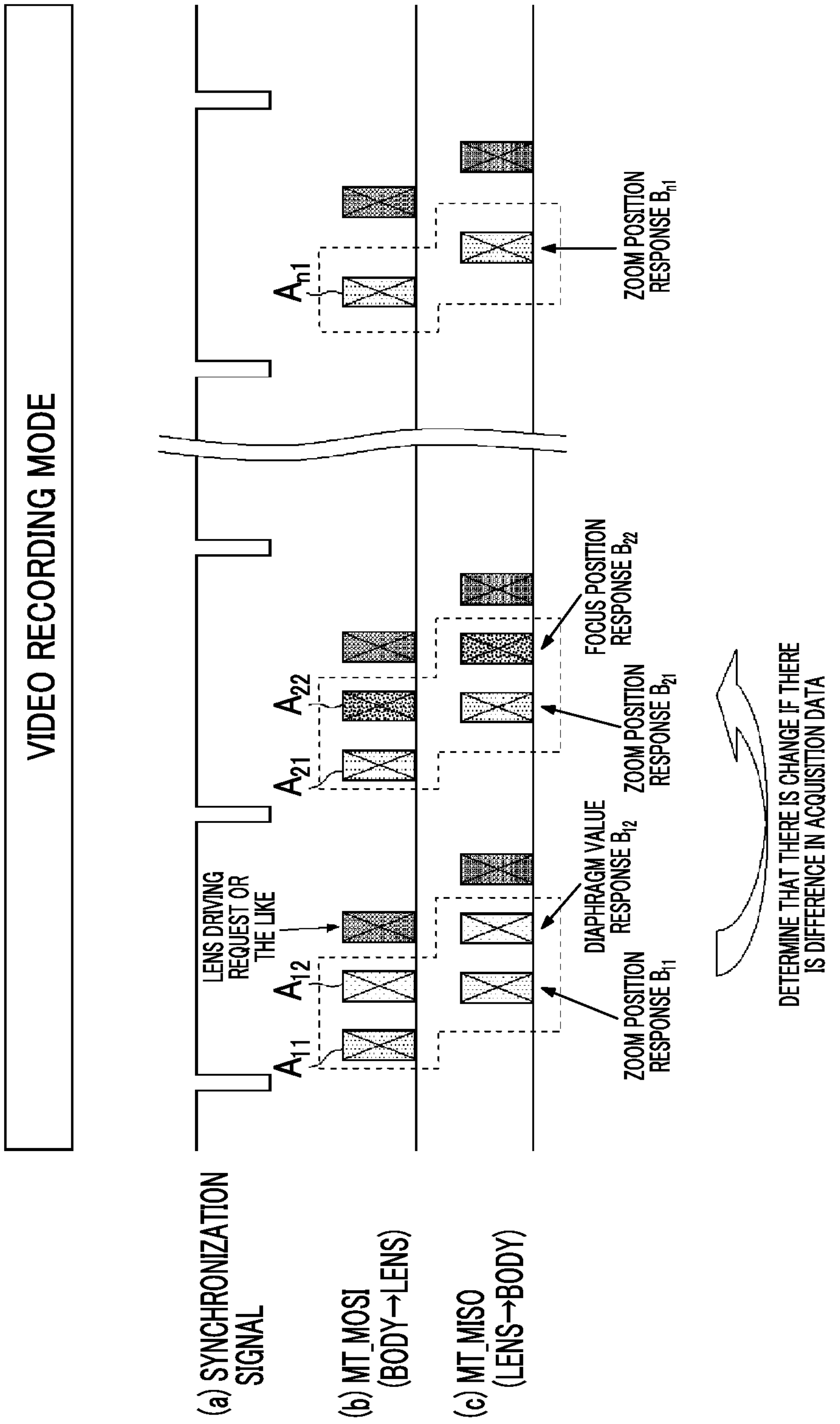
FIG. 8 is a timing chart illustrating a second embodiment of the communication method in the synchronous communication mode according to the present invention.

FIG. 8 is a timing chart illustrating a second embodiment of the communication method in the synchronous communication mode according to the present invention.

The synchronous communication mode of the second embodiment is a communication format in which a response to a request from the camera body 200 is performed in synchronization with the synchronization signal VSYNC ((a) in FIG. 8) in the video recording mode. This is the same as the first embodiment illustrated in FIG. 6 in that the synchronous communication mode is a communication mode in which the number of transmissions of the request signal (first request signal) relating to acquisition of various lens information in units of frames is limited. However, they differ in that a request signal requesting a lens state for confirming the lens state of the interchangeable lens 100 is not transmitted, and the number of transmissions of the request signal relating to the acquisition of the lens information is limited to 2 or smaller.

Now, it is necessary for the zoom position, the focus position, and the diaphragm value to be acquired as the lens information from the interchangeable lens 100, and if the zoom position is assumed to be most important lens information, the body-side CPU 220 transmits request signals $A_{11}, A_{21}, \ldots, A_{n1}$ for the zoom position in synchronization with each frame of the video and receives response signal $B_{11}, B_{21}, \ldots, B_{n1}$ from the interchangeable lens 100.

The body-side CPU 220 determines whether or not there is a difference in response signals $B_{11}, B_{21}, \ldots, B_{n1}$ of the zoom position received for each frame. In a case in which there is a difference, the body-side CPU 220 determines that the zoom lens 104 operates (the zoom position is changed). In particular, in a case in which the lens driving of the interchangeable lens 100 is set to a manual operation mode driven by a manual operation and the zoom lens 104 is driven by a zoom operation ring or the like without depending on a driving command from the camera body 200, it is preferable that the acquisition of the zoom position is most prioritized, and the zoom position is acquired for each frame of the video.

Meanwhile, since the number of transmissions of the request signal for lens information for each frame is limited to 2 or smaller, the request signal of lens information of either the focus position or the diaphragm value is transmitted as the request signal for lens information other than the zoom position. In this case, the request signal for lens information of the diaphragm value and the focus position can be transmitted alternately. Accordingly, the zoom position can be acquired for each frame, and the focus position and the diaphragm value can be acquired for every other frame.

Further, if it is detected that the zoom lens 104 is changed based on the zoom position acquired for each frame, it is preferable for the body-side CPU 220 to prioritize the acquisition of the focus position relative to the acquisition of the diaphragm value. That is, in a case in which the zoom lens 104 is changed, the acquisition of the focus position is also performed for each frame. In a case in which the zoom lens is a varifocal lens, the focus position is changed according to the zoom position. Accordingly, the driving of the focus lens for adjusting the focus position is necessary, but in a case in which the zoom lens is the varifocal lens and the zoom lens is changed, the body-side CPU 220 acquires the focus position in order to perform control of the focus lens that adjusts focus position.

Further, in a case in which the body-side CPU 220 determines that the zoom position does not change, the body-side CPU 220 can transmit only a request signal $A_{n1}$ for a zoom position as a request signal for lens information.

The body-side CPU 220 may determine whether there is a change in the focus lens 106 and the diaphragm 108 based on the focus position and the diaphragm value acquired in every other frame. It is preferable for a request signal for acquiring the lens information to be transmitted with a high priority assigned to an optical member in which there is a change.

By limiting the number of transmissions of the request signal for lens information transmitted in a period of one frame as above, time for performing communication other than the acquisition of lens information (communication such as a lens driving request) is ensured.

<Method of Determining Priority>

Next, an embodiment of the method of determining a priority of the lens information will be described.

Figure 9:
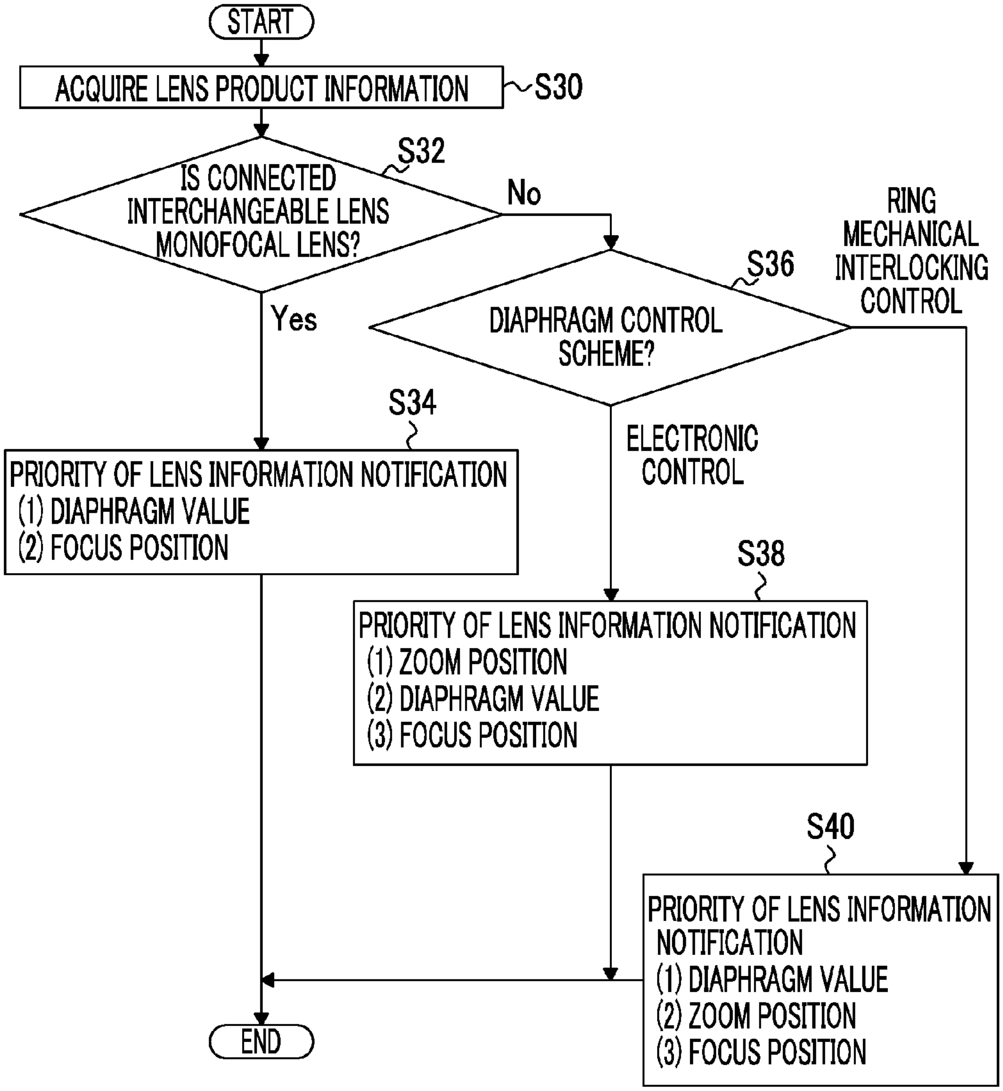
FIG. 9 is a flowchart illustrating an embodiment of a method of determining a priority of the lens information.

FIG. 9 is a flowchart illustrating an embodiment of a method of determining a priority of the lens information.

In FIG. 9, if the interchangeable lens is connected, the body-side CPU 220 acquires lens product information of the interchangeable lens through three-wire serial communication (step S30).

The body-side CPU 220 determines whether or not the connected interchangeable lens is a monofocal lens based on the acquired lens product information (step S32). If the body-side CPU 220 determines that the interchangeable lens is a monofocal lens ("Yes"), the body-side CPU 220 determines the priority of the lens information in an order of the diaphragm value and the focus position.

In a case in which the connected interchangeable lens is a monofocal lens as described above, since a focal length (zoom position) is not necessary as the lens information, the focal length is not involved in the priority of the lens information. This is because, in the case of the monofocal lens, since the focal length is fixed (since the zoom position does not change), the zoom position does not need to be requested, a restoration filter for each focal length is not prepared as a restoration filter for each monofocal lens provided, and the restoration filter does not need to be selected according to the focal length.

Further, a reason for prioritization of the diaphragm value relative to the focus position is that a selected restoration filter is greatly changed when the diaphragm value rather than the focus position is changed.

In a case in which two pieces of lenses information can be requested for each frame and lens driving or the like can be requested, the diaphragm value and the focus position may be set to be requested for each frame without providing a priority between the diaphragm value and the focus position.

On the other hand, if it is determined in step S32 that the connected interchangeable lens is not a monofocal lens ("No"), the body-side CPU 220 determines whether diaphragm control of the connected interchangeable lens is electronic control (diaphragm control according to a command from the camera body 200) or ring mechanical control (control according to a manual operation of the diaphragm ring) (step S36). In a case in which the interchangeable lens does not allow the ring mechanical control based on the lens product information of the interchangeable lens, the electronic control is determined. Further, in a case in which the diaphragm control is in an automatic control state or in a case in which diaphragm control is performed according to a command by a manual operation in the operation unit 222 of the camera body 200 even when an interchangeable lens allows ring mechanical control, the electronic control is determined.

If it is determined in step S36 that the diaphragm control of the interchangeable lens is electronic control, the body-side CPU 220 transitions to step S38 and determines the priority of the lens information in an order of the zoom position, the diaphragm value, and the focus position. Here, the reason for assignment a higher priority to the zoom position and the diaphragm value than the focus position is that a selected restoration filter greatly changes when the zoom position and the diaphragm value rather than the focus position change. Further, a reason for assignment of a higher priority to the zoom position than the diaphragm value is that, since the diaphragm control is electronic control, the body-side CPU 220 can recognize whether or not the diaphragm is changed.

Further, if it is determined in step S36 that the diaphragm control of the interchangeable lens is ring mechanical control, the body-side CPU 220 transitions to step S40 and determines the priority of the lens information in an order of the diaphragm value, the zoom position, and the focus position. Here, a reason for assignment of a higher priority to the diaphragm value than the zoom position is that, since the diaphragm control is ring mechanical control, the body-side CPU 220 cannot automatically recognize whether the diaphragm is changed and needs to acquire the diaphragm value from the interchangeable lens and monitor a change in the diaphragm always.

If the priority of the lens information is determined in step S34, S38, or S40, the body-side CPU 220 determines a frequency or an order of a request of each piece of lens information according to the determined priority of the lens information, determines a request signal relating to the lens information requested for each frame under a condition in which the number of transmissions is limited, and transmits the request signal relating to the lens information in synchronization with the frame.

In this embodiment, the priority of the diaphragm value is changed according to whether the diaphragm control scheme is a ring mechanical interlocking control scheme or an electronic control scheme. Similarly, in the interchangeable lens in which the zoom lens 104 and the focus lens 106 can be manually operated, the priority of the zoom position and the focus position may be changed (determined) according to whether the control scheme in the manual operation is a ring mechanical interlocking control scheme or an electronic control scheme.

Further, in a case in which each optical member of the interchangeable lens is driven according to a command from the camera body 200 regardless of whether the control is manual control or automatic control, it is preferable for a priority of the driven optical member to be higher than the priority of an optical member that stops. This is because the lens information of the optical member that stops does not normally change, and accordingly, the camera body 200 does not need to recognize the lens information for each frame. On the other hand, since the lens information of the optical member in operation changes, the camera body 200 needs to rapidly acquire the lens information, and it is preferable for a higher priority to be assigned to the lens information. Further, the lens information of the optical member in operation is for the purpose of use for a point image restoration process and is also necessary as information for controlling the optical member, and it is preferable for the lens information to be prioritized relative to the stopping optical member.

<Method of Determining Content of Image Processing>

Next, an embodiment of a method of determining content of the image processing will be described.

Figure 10:
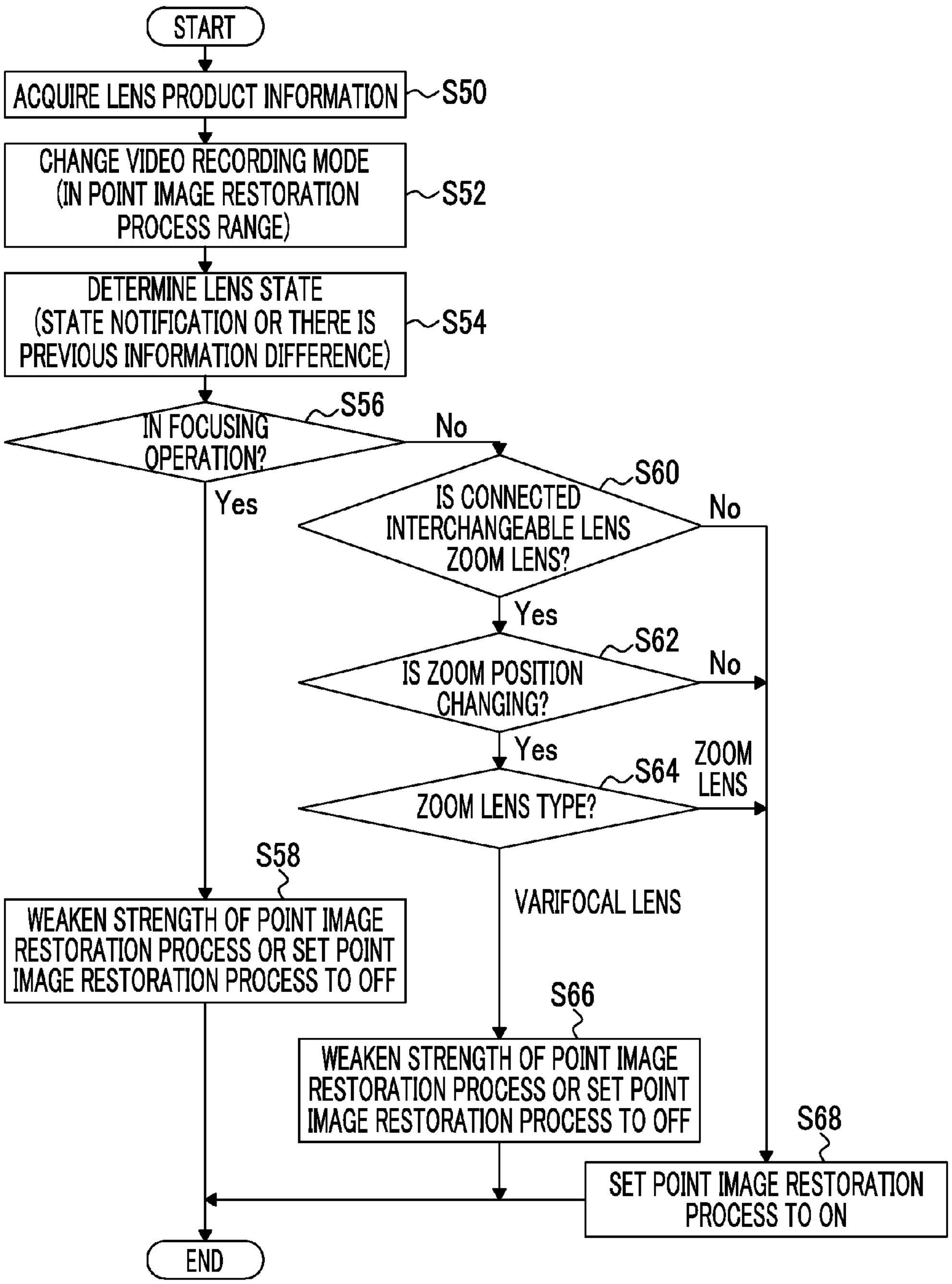
FIG. 10 is a flowchart illustrating a procedure of a method of determining content of image processing.

FIG. 10 is a flowchart illustrating a procedure of a method of determining content of the image processing and, particularly, a case in which any one of a point image restoration process ON setting in which the point image restoration process is executed, a setting for weakening the strength of the point image restoration process, or a point image restoration process OFF setting in which the point image restoration process is not performed is determined is shown.

In FIG. 10, if the interchangeable lens is connected, the body-side CPU 220 acquires the lens product information of the interchangeable lens through three-wire serial communication (step S50). Further, the body-side CPU 220 performs the following process only in a case in which the mode is changed to the video recording mode and the point image restoration process is performed in a point image restoration process range (step S52). Accordingly, in a case in which the camera body does not enter the video recording mode or the interchangeable lens is a point image restoration process non-compliant lens, the following process is not performed.

In step S54, the body-side CPU 220 determines a lens state in the video recording mode. Methods of determining the lens state include a method of transmitting a request signal requesting a lens state to the interchangeable lens as described above and determining the lens state based on a response signal to the request signal, and a method of determining a lens state according to presence or absence of a change in the lens information acquired for each frame.

Subsequently, the body-side CPU 220 determines whether or not the focus lens 106 is in a focusing operation based on the lens state of the interchangeable lens acquired in step S54 (Step S56). If it is determined that the focus lens 106 is in a focusing operation ("Yes"), the body-side CPU 220 sets the strength of the point image restoration process to be weak or sets the point image restoration process to OFF (step S58).

The frame of the video acquired during the focusing operation is a defocused image (blurred image). If the point image restoration process using the restoration filter is performed the blurred image, excessive correction is performed and image quality is rather degraded. Therefore, during the focusing operation, the strength of the point image restoration process is set to be weak or the point image restoration process is set to OFF.

Here, the setting of weakening the strength of the point image restoration process refers to setting of performing the restoration process using the sharpening filter 228B. This is because the sharpening filter 228B is a moderate filter and is a filter of which the effects of point image restoration are small (that does not easily generate artifacts). One of the setting of weakening the strength of the point image restoration process and the setting of setting the point image restoration process to OFF may be appropriately selected by a user operation on a video capturing menu screen.

On the other hand, if the body-side CPU 220 determines that the focus lens 106 is in a focusing state and not in a focusing operation in step S56 ("No"), the body-side CPU then determines whether the connected interchangeable lens is a zoom lens based on the lens product information acquired in step S50 (step S60). If the body-side CPU determines that the connected interchangeable lens is not a zoom lens (monofocal lens) ("No"), the body-side CPU 220 transitions to step S68, and sets the point image restoration process to ON. This is because the frame of the video is a focusing state and the zoom magnification does not change, and accordingly, the point image restoration process can be satisfactorily performed.

Further, if the body-side CPU determines that the connected interchangeable lens is a zoom lens in step S60, the body-side CPU 220 then determines whether or not the zoom position of the zoom lens 104 is changing (step S62). If the body-side CPU 220 determines that the zoom position is not changing, the body-side CPU 220 transitions to step S68 and sets the point image restoration process to ON, similar to the case in which the monofocal lens is connected.

On the other hand, if the body-side CPU 220 determines that the zoom position is changing (in a zoom operation) in step S62 ("Yes"), the body-side CPU 220 determines whether a zoom lens type of the connected interchangeable lens is a zoom lens having a compensator lens that corrects defocus in conjunction with a variator lens or a varifocal lens, based on the lens product information acquired in step S50 (step S60). In the case of the zoom lens, the defocus does not occur in the zoom operation. Accordingly, if the body-side CPU 220 determines that the type is the zoom lens, the body-side CPU 220 transitions to step S68 and sets the point image restoration process to ON.

In a case in which the zoom lens type is a varifocal lens, the focus is shifted with a zoom operation. Accordingly, the frame of the video becomes a blurred image. In the case of the varifocal lens, since the focus is shifted with the zoom operation, focusing control is separately performed by the focus lens 106, but there is a time lag until focusing is achieved. Accordingly, in a case in which the varifocal lens is in the zoom operation, the body-side CPU 220 transition to step S66 and performs setting to weaken the strength of the point image restoration process or sets the point image restoration process to OFF.

Using the above method of determining the content of the image processing, information indicating a countermeasure situation of the point image restoration process (point image restoration process countermeasure situation information), that is, setting information of point image restoration process ON (first setting information), setting information of use of the sharpening filter (second setting information), or setting information of point image restoration process OFF (third setting information) can be acquired.

It is preferable for the body-side CPU 220 to determine (control) the lens information requested to the interchangeable lens based on the point image restoration process countermeasure situation information in a case in which the body-side CPU 220 acquires the lens information in synchronization with the frame. For example, in a case in which the point image restoration process is set to OFF or in a case in which the use of the sharpening filter is set so as to weaken the strength of the point image restoration process, the lens information to be used to select the restoration filter is not necessary. Therefore, the body-side CPU 220 can determine a priority of the lens information requested to the interchangeable lens based on the point image restoration process countermeasure situation information.

<Control of Switching Communication Mode>

Next, control of switching between a normal communication mode (first communication mode) and the above-described synchronous communication mode (second communication mode) will be described.

Figure 11:
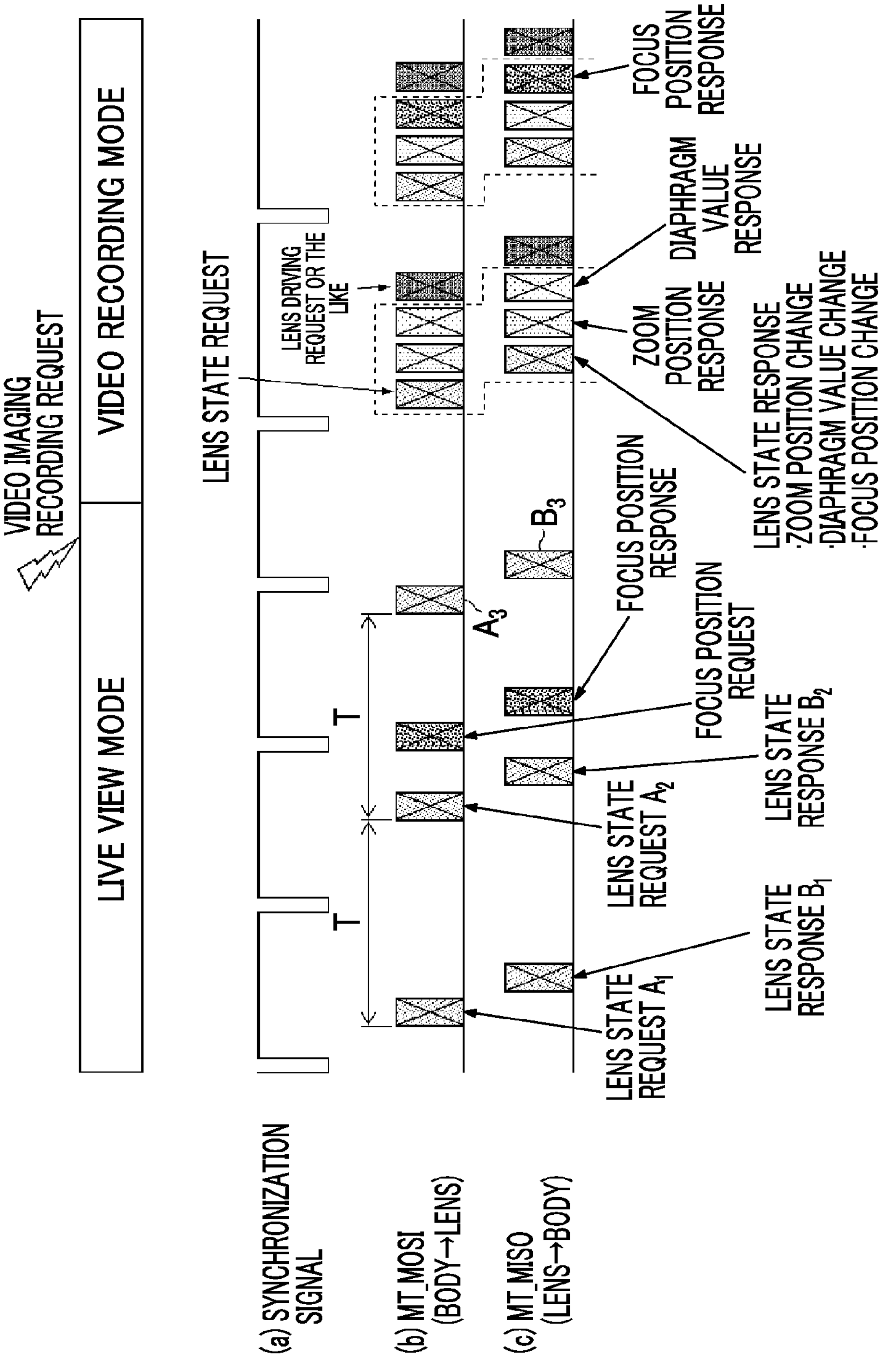
FIG. 11 is a timing chart illustrating a communication method in a normal communication mode and a communication method in a synchronous communication mode.

FIG. 11 is a timing chart illustrating a communication method in the normal communication mode and a communication method in the synchronous communication mode.

As illustrated in FIG. 11, the normal communication mode is a communication mode used in a live view mode. In the normal communication mode, when the camera body 200 acquires the lens information or the like, request signals $A_1$, $A_2$, and $A_3$ requesting a lens state are transmitted from the camera body 200 to the interchangeable lens 100 at a certain period T as illustrated in (b) of FIG. 11 without depending on the synchronization signal VSYNC of the imaging element 201 ((a) in FIG. 11), and response signals $B_1$, $B_2$, and $B_3$ corresponding to the request signals $A_1$, $A_2$, and $A_3$ are transmitted from the interchangeable lens 100 to the camera body 200, as illustrated in (c) of FIG. 11.

If the camera body 200 detects that an optical member in the interchangeable lens 100 is in operation, the camera body 200 transmits a request signal for the lens information for acquiring lens information of the optical member in operation to the interchangeable lens 100, and receives a response signal thereto. For example, if the camera body 200 recognizes that the focus lens 106 is in operation from the response signal $B_2$ of the lens state, the camera body 200 transmits a request signal for the focus position for acquiring the focus position of the focus lens 106 to the interchangeable lens 100, and receives a response signal thereto.

In the live view mode of this embodiment, the frame rate is changed for a countermeasure so as to cause the exposure to follow luminance conditions of the subject. Therefore, in the case of a dark scene, the frame rate decreases (a period of one frame increases). In the normal communication mode, even when the period of one frame increases, the lens information can be acquired at a constant period T and reflected in lens driving. Accordingly, there is an advantage in that an appropriate display of the live view can be performed without display delay.

On the other hand, the synchronous communication mode is a communication mode adopted at least in the video recording mode. In the video recording mode, the frame rate of the video is usually fixed (for example, 30 fps or 60 fps), and in a case in which, for example, correction according to lens optical characteristics (for example, a point image restoration process) is applied to each frame of the video, it is necessary to accurately notify the camera body 200 of a lens state in each frame.

However, in the communication between the camera body 200 and the interchangeable lens 100, a communication format in which a response to the request from the camera body 200 is performed is adopted since there are various interactions such as a lens driving request, in addition to the notification of the lens information or the like. However, it may be difficult to acquire various lens information while performing lens driving for a limited time such as a frame unit.

Therefore, it is preferable for switching to be performed from the normal communication mode to the synchronous communication mode in a case in which the video recording mode is instructed.

The synchronous communication mode of this example is a communication mode adopted in the video recording mode and is a communication format in which a response to a request from the camera body 200 is performed in synchronization with the synchronization signal VSYNC as described with reference to FIG. 6, but is a communication mode in which the number of transmissions of the request signal relating to the acquisition of various lens information of a frame unit is limited.

In the live view mode (standby state), if the shutter release button 22 is full-pressed and the S2 ON signal is output, the camera body 200 enters the video recording mode in which recording of the video starts.

In the example illustrated in FIG. 11, if switching is performed from the live view mode to the video recording mode, the communication mode is switched from the normal communication mode to the synchronous communication mode, but the normal communication mode may be maintained according to, for example, whether the connected interchangeable lens is a lens corresponding to the point image restoration process or whether ON setting is made to execute the point image restoration process.

Figure 12:
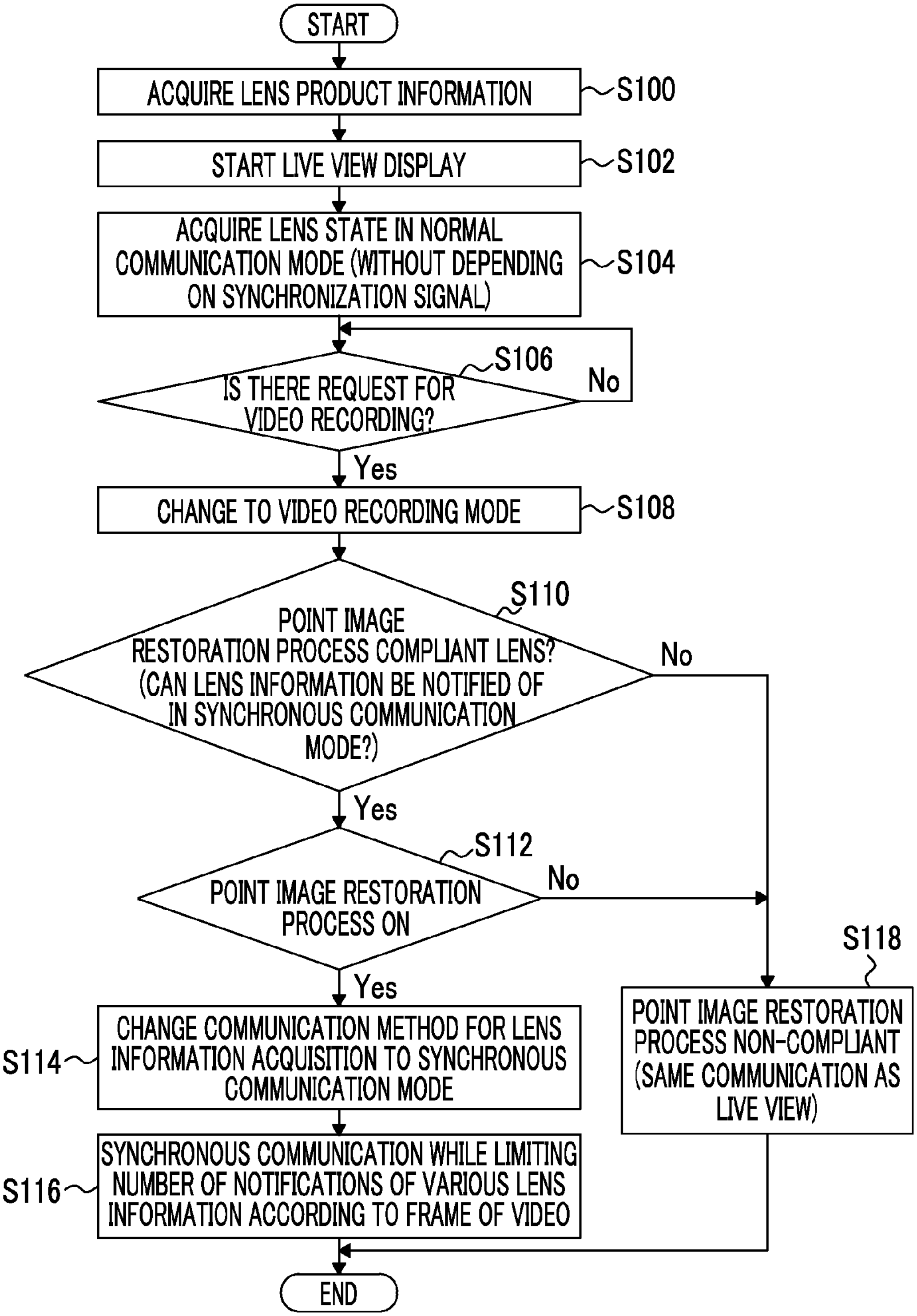
FIG. 12 is a flowchart illustrating a flow of a process of switching between communication in the normal communication mode and communication in the synchronous communication mode.

FIG. 12 is a flowchart mainly illustrating a flow of a process of switching between communication in the normal communication mode and communication in the synchronous communication mode.

As illustrated in FIG. 12, if the interchangeable lens 100 is mounted, the body-side CPU 220 acquires the lens product information of the interchangeable lens 100 through three-wire serial communication (step S100).

Thereafter, if power is turned on by an operation of the power lever 25, the body-side CPU 220 enters the live view mode and performs capturing of an image in the live view mode and control of displaying the captured live view on the monitor 216 (step S102).

The body-side CPU 220 sets a communication mode to the normal communication mode in the live view mode, transmits the request signal to the interchangeable lens, and acquires information of the lens state from the interchangeable lens at a certain period T (a period that does not depend on the synchronization signal of the imaging element 201) as illustrated in FIG. 11 (step S104).

Subsequently, the body-side CPU 220 determines whether or not there is a request for video recording according to whether the S2 ON signal indicating full press of the shutter release button 22 is input in the video mode (step S106). If the body-side CPU 220 determines that there is the request for video recording, the body-side CPU 220 changes from the live view mode to the video recording mode and starts imaging and recording of the video (step S108).

Here, it is determined whether the communication mode in the movie recording mode is maintained as the normal communication mode or is switched to the synchronous communication mode, as follows.

That is, the body-side CPU 220 determine whether or not the interchangeable lens connected to the camera body 200 is a lens corresponding to the point image restoration process (point image restoration process compliant lens/point image restoration process non-compliant lens) based on the lens product information acquired in step S100 (step S110).

If the body-side CPU 220 determines that the connected interchangeable lens is not the point image restoration process compliant lens in step S110 ("No"), the body-side CPU 220 transitions to step S118 and maintains the normal communication mode (the same communication mode as the live view mode). This is because, in a case in which the connected interchangeable lens is the point image restoration process non-compliant lens, the point image restoration process is not performed on each frame of the video, and accordingly, the body-side CPU 220 does not need to acquire the lens information in synchronization with the frame of the imaging element 201.

Further, if the body-side CPU 220 determines that the connected interchangeable lens is the point image restoration process compliant lens in step S110 ("Yes"), the body-side CPU 220 transitions to step S112 and determines an ON/OFF situation of the point image restoration process set in the camera body (countermeasure situation of the point image restoration process). If the body-side CPU 220 determines that the point image restoration process is not set to ON ("No"), the point image restoration process is not performed on each frame in the video captured in the video recording mode. Accordingly, the base-side CPU 220 transitions to step S118 and maintains the normal communication mode, similarly to a case of the point image restoration process non-compliant lens.

On the other hand, if the body-side CPU 220 determines that the point image restoration process is set to ON in step S112 ("Yes"), the body-side CPU 220 switches the communication mode for acquiring lens information or the like from the normal communication mode to the synchronous communication mode (step S114). If the communication mode is switched to the synchronous communication mode, the body-side CPU 220 performs communication of transmitting the request signal for lens information and receiving the response signal from the interchangeable lens according to the frame of the video (in synchronization with a synchronous communication VSINC of the imaging element 201) while limiting the number of transmissions of request signals of various lens information in a period of one frame (step S116).

In this example, switching is performed between the normal communication mode and the synchronous communication mode according to whether the point image restoration process is performed in the video recording mode.

[Others]

The frame rate of the video in the video recording mode is normally fixed (for example, 30 fps or 60 fps), and can be set by a user operation on the video capturing menu screen. Accordingly, when the number of transmissions of the request signal relating to the acquisition of the lens information for each frame is limited, the limited number of transmissions may be switched according to a set current frame rate. For example, in a case in which a low frame rate capable of acquiring necessary lens information is set, the number of transmissions of the request signal relating to the acquisition of the lens information may not be limited. Further, for high image quality of the video, for example, a high frame rate such as 120 fps or 240 fps may be set, or since performance of the lens-side CPU and the control unit of each optical member is low relative to the frame rate, in a case in which the lens information cannot be acquired for each frame, the number of transmissions of the request signal relating to the acquisition of the lens information may decrease, such as once in every two frames or once in every three frames, so that both of a frame period in which the lens information is acquired and a frame period in which the lens information is not acquired exist.

Further, as a lens information notifying method in which the interchangeable lens notifies the camera body of the lens information in the video recording mode, it is preferable that, when the zoom position is changed and the diaphragm value cannot be acquired in a case in which the interchangeable lens is a zoom lens and the diaphragm control is an electronic control scheme, a diaphragm value after a change of the zoom position is calculated from lens product information of the interchangeable lens (information indicating a relationship between the zoom position and the focal length) and the diaphragm value before a change of the zoom position, and is transmitted to the camera body.

Further, in the point image restoration process, only in a case in which the lens information is changed out of a range in which there is no influence on the point image restoration process (a threshold value set from an allowable value), it is preferable for the interchangeable lens to notify the camera body of the lens information. This is because, in a case in which the lens information is within the allowable value, since there is no influence on the point image restoration process, it is not necessary to transmit the lens information for each frame. The camera body 200 may have the allowable value and notify the interchangeable lens of the allowable value, or the interchangeable lens may have the allowable value.

Further, in a case in which the interchangeable lens has the allowable value, the interchangeable lens may notify the camera body of the allowable value. Further, in a case in which the camera body performs the point image restoration process using the sharpening filter for a lens type, it is preferable for the allowable value to be set for each lens type.

While the communication between the camera body and the interchangeable lens is three-wire serial communication in this embodiment, a communication method is not limited to the three-wire serial communication and may be two-wire or four-wire serial communication or may be wireless communication.

Further, although the point image restoration process of performing the restoration process on the luminance signal has been described as the image processing in the video recording mode, the image processing may be a point image restoration process of performing the restoration process on image data of each color of RGB. Further, the image processing is not limited to the point image restoration process. For example, shading correction, distortion correction, or aberration correction may be performed on the video data of each frame based on the lens information acquired from the interchangeable lens for each frame.

The image processing in the video recording mode is not limited thereto, and may be image processing performed on an image acquired based on the lens information, or a part or all of the image processing may be adjusted or changed based on, for example, the diaphragm information, the zoom information, or the focus position.

For example, in a case in which the image processing is filter processing, strength or a gain of the filter and a type of filter may be changed based on the lens information. Further, parameters of the image processing may be changed based on the lens information. For example, the image processing may be white balance processing for improving the processing precision using brightness information of a subject at the time of imaging obtained from the diaphragm information. Further, the lens information is preferably a combination between the diaphragm information of which a frequency of use for image processing is high and the focus position or the diaphragm information and the zoom information, but is not limited thereto.

Further, the lens information may include position information of a correction lens in an optical camera shake correction mechanism. Since optical characteristics such as distortion is changed according to the position of the correction lens in the optical camera shake correction mechanism, image processing according to the position information of the correction lens is performed so that a higher-precision image correction process can be performed.

Further, the present invention is not limited to the above-described embodiments, and it is understood that various modifications can be made without departing from the spirit of the present invention.

EXPLANATION OF REFERENCES

10: imaging device (camera system)
22: shutter release button
100: interchangeable lens
102: imaging optical system
104: zoom lens
106: focus lens
108: diaphragm
120: lens-side CPU
122, 207: RAM
124, 228: ROM
126, 226: flash ROM
150: lens-side communication unit
200: camera body
201: imaging element
206: digital signal processing unit
206A: demosaic processing unit
206C: restoration processing unit
212: memory card
216: monitor
220: body-side CPU
222: operation unit
228A: restoration filter
228B: sharpening filter
250: body-side communication unit

What is claimed is:

1. A camera system including a camera body and an interchangeable lens freely detachable from the camera body, wherein the interchangeable lens comprises a lens-side communication processor that performs communication with the camera body; and a lens-side control processor that transmits a response signal corresponding to a received request signal from the lens-side communication processor to the camera body in case of receiving a request signal from the camera body via the lens-side communication processor, and the camera body comprises a body-side communication processor that performs communication with the interchangeable lens;

a body-side control processor that transmits in every frame a first request signal relating to acquisition of lens information to the interchangeable lens via the body-side communication processor in synchronization with a frame of a video in a video recording mode, the body-side control processor limiting the number of transmissions of the first request signal transmitted to the interchangeable lens in a period of one frame of a video less than the number of transmissions of the request signal that can be required in a period of one frame of the video; and a digital signal processing processor that performs image processing on each frame of the video using the response signal corresponding to transmitted the first request signal.

2. The camera system according to claim 1, wherein, in a case in which the number of pieces of lens information necessary for image processing in the video recording mode is greater than the limited number of transmissions of the first request signal, the body-side control processor transmits the first request signal having different types to be distributed among a plurality of frame periods.

3. The camera system according to claim 1, wherein the body-side control processor transmits a second request signal relating to lens driving in a period of one frame the video in which the number of transmissions of the first request signal is limited.

4. The camera system according to claim 1, wherein the body-side control processor determines a type of the first request signal transmitted in synchronization with the frame of the video for each frame.

5. The camera system according to claim 4, wherein, in a case where a type of the first request signal transmitted in synchronization with a frame of a video is determined for each frame, the body-side control processor determines a priority of each type of the lens information, and determines a frequency of the transmission of the first request signal for each type of lens information or an order of the transmission according to the determined priority.

6. The camera system according to claim 5, wherein the body-side control processor determines the priority for each type of the lens information according to a type of interchangeable lens, an operation state of the interchangeable lens, or content of image processing in the video recording mode.

7. The camera system according to claim 6, wherein, in a case in which an interchangeable lens having an optical member driven by a second request signal relating to lens driving from the camera body is mounted, the body-side control processor assigns a low priority to the first request signal for the optical member.

8. The camera system according to claim 6, wherein, in a case in which an interchangeable lens having an optical member driven on the lens side alone is mounted, the body-side control processor assigns a high priority to the first request signal for the optical member.

9. The camera system according to claim 6, wherein the body-side control processor detects an operation state of the interchangeable lens based on a response signal to a third request signal relating to the acquisition of the lens state, or detects an operation state of the interchangeable lens based on a response signal to a previously received first request signal and a response signal to a current received first request signal, and assigns a lower priority to the first request signal for an optical member that does not operate among respective optical members of the interchangeable lens than to the first request signal for the optical member that operates.

10. The camera system according to claim 6, wherein, in a case in which a monofocal interchangeable lens is mounted, the body-side control processor assigns a high priority to a first request signal requesting acquisition of a diaphragm value, and does not transmit a first request signal requesting acquisition of the zoom information or assigns a low priority to the first request signal requesting acquisition of the zoom information.

11. The camera system according to claim 1, wherein the body-side control processor changes the limited number of transmissions of a first request signal according to a type of interchangeable lens, an operation state of the interchangeable lens, or content of image processing in a video recording mode.

12. The camera system according to claim 1, wherein the body-side control processor includes a communication mode switching processor that switches between a first communication mode in which transmission and reception of a request signal and a response signal are performed without synchronization with a frame of a video and a second communication mode in which transmission and reception of a request signal and a response signal are performed in synchronization with the frame of the video.

13. The camera system according to claim 12, wherein the body-side control processor switches between the first communication mode and the second communication mode according to a type of interchangeable lens, an operation state of the interchangeable lens, or content of image processing in a video recording mode.

14. The camera system according to claim 1, wherein the body-side control processor controls the first request signal based on countermeasure situation information of a point image restoration process using a restoration filter based on a point spread function in a video recording mode.

15. The camera system according to claim 14, wherein the countermeasure situation information of the point image restoration process is at least one of first setting information indicating that the camera body selects a restoration filter based on at least one of diaphragm information, zoom information, and focus position information of the interchangeable lens, and performs a point image restoration process using the selected restoration filter, second setting information indicating that the camera body performs the point image restoration process on any one of different imaging conditions, a different individual lens of the same type, and a different lens type using a sharpening filter that suppresses excessive correction, and third setting information indicating that the camera body does not perform the point image restoration process.

16. The camera system according to claim 14, wherein the countermeasure situation information of the point image restoration process is information indicating ON/OFF of the point image restoration process set in the camera body.

17. A camera body from which an interchangeable lens is freely detachable, the camera body comprising:

a body-side communication processor that performs communication with the mounted interchangeable lens;

a body-side control processor that transmits in every frame a first request signal relating to acquisition of lens information to the interchangeable lens via the body-side communication processor in synchronization with a frame of a video in a video recording mode, the body-side control processor limiting the number of transmissions of the first request signal transmitted to the interchangeable lens in a period of one frame of a video less than the number of transmissions of the request signal that can be required in a period of one frame of the video; and a digital signal processing processor that performs image processing on each frame of the video using the response signal corresponding to transmitted the first request signal.

18. The camera body according to claim 17, wherein, in a case in which the number of pieces of lens information necessary for image processing in the video recording mode is greater than the limited number of transmissions of the first request signal, the body-side control processor transmits the first request signals having different types to be distributed among a plurality of frame periods.

19. The camera body according to claim 17, wherein the body-side control processor transmits a second request signal relating to lens driving in a period of one frame in which the number of transmissions of the first request signal is limited.

20. A communication method between a camera body and an interchangeable lens mounted on the camera body, wherein the camera body transmits in every frame a first request signal relating to acquisition of lens information to the interchangeable lens in synchronization with a frame of a video in the video recording mode, the interchangeable lens transmits a response signal to the first request signal to the camera body;

the camera body transmits the first request signal that is transmitted in a period of one frame of a video in the video recording mode with the limited number of transmissions of the first request signal less than the number of transmissions of the request signal that can be required in a period of one frame of the video; and the camera body performs image processing on each of the video using the response signal corresponding to transmitted the first request signal.

21. The communication method according to claim 20, wherein, in a case in which the number of pieces of lens information necessary for image processing in the video recording mode is greater than the limited number of transmissions of the first request signal, the camera body transmits the first request signals having different types to be distributed among a plurality of frame periods.

22. The communication method according to claim 20,

Wherein the camera body transmits a second request signal relating to lens driving in a period of one frame in which the number of transmissions of the first request signal is limited.

* * * * *